US012653368B2

(12) United States Patent
Chang et al.

(10) Patent No.: US 12,653,368 B2
(45) Date of Patent: Jun. 16, 2026

(54) OIL ABSORBENT WIPING PRODUCT

(71) Applicant: Kimberly-Clark Worldwide, Inc.,
Neenah, WI (US)

(72) Inventors: Yu-Wen Chang, Alpharetta, GA (US);
John Gavin MacDonald, Decatur, GA
(US); Vikram S. Kaul, Atlanta, GA
(US); Jennifer L Doherty, Decatur, GA
(US); James R. Morgan, Alpharetta,
GA (US); Kaiyuan Yang, Cumming,
GA (US); Michael R. Vaughan,
Atlanta, GA (US)

(73) Assignee: Kimberly-Clark Worldwide, Inc.,
Neenah, WI (US)

( * ) Notice: Subject to any disclaimer, the term of this
patent is extended or adjusted under 35
U.S.C. 154(b) by 616 days.

(21) Appl. No.: 15/779,412

(22) PCT Filed: Jul. 29, 2016

(86) PCT No.: PCT/US2016/044746
§ 371 (c)(1),
(2) Date: May 25, 2018

(87) PCT Pub. No.: WO2017/095483
PCT Pub. Date: Jun. 8, 2017

(65) Prior Publication Data
US 2018/0368647 A1      Dec. 27, 2018

Related U.S. Application Data

(60) Provisional application No. 62/315,714, filed on Mar.
31, 2016, provisional application No. 62/261,652,
filed on Dec. 1, 2015.

(51) Int. Cl.
*A47L 13/16* (2006.01)
*A47L 13/17* (2006.01)
(Continued)

(52) U.S. Cl.
CPC ............... *A47L 13/16* (2013.01); *A47L 13/17*
(2013.01); *B01J 20/261* (2013.01);
(Continued)

(58) Field of Classification Search
CPC ......... A47L 13/16; A47L 13/17; B32B 27/12;
B32B 5/02; B32B 27/302; B32B 3/266;
(Continued)

(56) References Cited

U.S. PATENT DOCUMENTS 3,338,992 A      8/1967  Kinney
3,341,394 A      9/1967  Kinney
(Continued)

FOREIGN PATENT DOCUMENTS

CN           101094644 A    12/2007
WO      WO2015/095731 A1    6/2015

OTHER PUBLICATIONS

Brazilian Office Action Corresponding to Application No.
BR112018009724-1 on Jul. 28, 2021.
(Continued)

*Primary Examiner* — Elizabeth M Imani
(74) *Attorney, Agent, or Firm* — Dority & Manning, P.A.

(57)                  ABSTRACT

A wiping product is disclosed that is well suited for wiping
up oils and greases. More particularly, the wiping product
has been engineered to wipe up and absorb oils within the
interior of the product. The wiper is made from a laminate
containing outer layers designed to wick away and/or adsorb
oily substances from a surface. The wiper also includes an
elastic middle layer that is oil absorbable. In one embodi-
ment, the outer layers are stretch bonded to the elastic
middle layer so that the outer layers gather and create void
spaces within the product.

26 Claims, 9 Drawing Sheets

(51) Int. Cl.

| | |
|---|---|
| *B01J 20/26* | (2006.01) |
| *B01J 20/32* | (2006.01) |
| *B32B 3/26* | (2006.01) |
| *B32B 5/02* | (2006.01) |
| *B32B 5/06* | (2006.01) |
| *B32B 5/08* | (2006.01) |
| *B32B 5/26* | (2006.01) |
| *B32B 7/04* | (2019.01) |
| *B32B 7/05* | (2019.01) |
| *B32B 25/10* | (2006.01) |
| *B32B 27/12* | (2006.01) |
| *B32B 27/20* | (2006.01) |
| *B32B 27/30* | (2006.01) |
| *B32B 27/32* | (2006.01) |
| *C09K 3/32* | (2006.01) |
| *D06N 3/00* | (2006.01) |
| *D06N 3/04* | (2006.01) |

(52) U.S. Cl.
CPC ....... *B01J 20/3231* (2013.01); *B01J 20/3295* (2013.01); *B32B 3/26* (2013.01); *B32B 3/266* (2013.01); *B32B 5/02* (2013.01); *B32B 5/022* (2013.01); *B32B 5/06* (2013.01); *B32B 5/08* (2013.01); *B32B 5/26* (2013.01); *B32B 7/04* (2013.01); *B32B 7/05* (2019.01); *B32B 25/10* (2013.01); *B32B 27/12* (2013.01); *B32B 27/20* (2013.01); *B32B 27/302* (2013.01); *B32B 27/32* (2013.01); *B32B 27/327* (2013.01); *C09K 3/32* (2013.01); *D06N 3/0011* (2013.01); *D06N 3/0059* (2013.01); *D06N 3/0088* (2013.01); *D06N 3/045* (2013.01); *B32B 2250/03* (2013.01); *B32B 2250/20* (2013.01); *B32B 2250/40* (2013.01); *B32B 2262/0215* (2013.01); *B32B 2262/023* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/0284* (2013.01); *B32B 2262/0292* (2013.01); *B32B 2262/04* (2013.01); *B32B 2264/04* (2013.01); *B32B 2264/067* (2013.01); *B32B 2264/10* (2013.01); *B32B 2264/102* (2013.01); *B32B 2264/104* (2013.01); *B32B 2264/108* (2013.01); *B32B 2274/00* (2013.01); *B32B 2307/51* (2013.01); *B32B 2307/538* (2013.01); *B32B 2307/54* (2013.01); *B32B 2307/718* (2013.01); *B32B 2432/00* (2013.01); *D06N 2205/16* (2013.01); *D06N 2209/148* (2013.01); *D06N 2211/08* (2013.01)

(58) Field of Classification Search
CPC .......... B32B 27/32; B32B 3/26; B32B 27/20; B32B 5/06; B32B 5/08; B32B 7/05; B32B 27/327; B32B 5/022; B32B 5/26; B32B 7/04; B32B 25/10; B32B 2250/40; B32B 2264/067; B32B 2264/102; B32B 2262/0238; B32B 2262/0276; B32B 2250/03; B32B 2262/023; B32B 2307/538; B32B 2262/0215; B32B 2262/0261; B32B 2307/54; B32B 2262/0253; B32B 2262/0292; B32B 2264/108; B32B 2264/04; B32B 2250/20; B32B 2264/104; B32B 2262/0246; B32B 2262/0284; B32B 2307/718; B32B 2262/04; B32B 2264/10; B32B 2274/00; B32B 2307/51; B32B 2432/00; B01J 20/261; B01J 20/3231; B01J 20/3295; C09K 3/32; D06N 3/0011; D06N 3/0059; D06N 3/0088; D06N 3/045; D06N 2205/16; D06N 2209/148; D06N 2211/08; C08L 23/10; C08L 53/02; C09D 7/00; C09D 125/10; C09D 153/02; D04H 1/72; B08B 1/006
USPC ........................................................ 442/328
See application file for complete search history.

(56) References Cited

U.S. PATENT DOCUMENTS

| | | | |
|---|---|---|---|
| 3,485,706 A | 12/1969 | Evans | |
| 3,502,538 A | 3/1970 | Petersen | |
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,844,869 A | 10/1974 | Rust, Jr. | |
| 3,849,241 A | 11/1974 | Butin et al. | |
| 3,939,033 A | 2/1976 | Grgach et al. | |
| 4,100,324 A | 7/1978 | Anderson et al. | |
| 4,259,399 A | 3/1981 | Hill | |
| 4,340,563 A | 7/1982 | Appel et al. | |
| 4,440,597 A | 4/1984 | Wells et al. | |
| 4,551,199 A | 11/1985 | Weldon | |
| 4,720,415 A | 1/1988 | Vander Wielen et al. | |
| 4,737,394 A | 4/1988 | Zafiroglu | |
| 4,781,966 A | 11/1988 | Taylor | |
| 4,832,852 A | 5/1989 | Wells et al. | |
| 4,849,054 A | 7/1989 | Klowak | |
| 5,048,589 A | 9/1991 | Cook et al. | |
| 5,096,532 A | 3/1992 | Neuwirth et al. | |
| 5,110,403 A | 5/1992 | Ehlert | |
| 5,114,781 A * | 5/1992 | Morman | D04H 1/56 |
| | | | 428/198 |
| 5,129,988 A | 7/1992 | Farrington, Jr. | |
| 5,229,191 A | 7/1993 | Austin | |
| 5,292,582 A * | 3/1994 | Gibbs | A47L 13/20 |
| | | | 428/326 |
| 5,382,400 A | 1/1995 | Pike et al. | |
| 5,385,775 A | 1/1995 | Wright | |
| 5,399,412 A | 3/1995 | Sudall et al. | |
| 5,494,554 A | 2/1996 | Edwards et al. | |
| 5,503,908 A | 4/1996 | Faass | |
| 5,508,102 A | 4/1996 | Georger et al. | |
| 5,620,779 A | 4/1997 | Levy et al. | |
| 5,656,132 A | 8/1997 | Farrington, Jr. et al. | |
| 5,667,636 A | 9/1997 | Engel et al. | |
| 5,716,625 A | 2/1998 | Hahn et al. | |
| 5,817,199 A | 10/1998 | Brennecke et al. | |
| 5,830,321 A | 11/1998 | Lindsaye et al. | |
| 5,851,935 A | 12/1998 | Srinivasan et al. | |
| 5,960,508 A | 10/1999 | Holt et al. | |
| 6,015,764 A | 1/2000 | McCormack et al. | |
| 6,017,417 A | 1/2000 | Wendt et al. | |
| 6,025,050 A | 2/2000 | Srinivasan et al. | |
| 6,048,123 A | 4/2000 | Holt et al. | |
| 6,075,179 A | 6/2000 | McCormack et al. | |
| 6,132,841 A | 10/2000 | Guthrie et al. | |
| 6,269,513 B1 | 8/2001 | Torobin | |
| 6,550,092 B1 | 4/2003 | Brown et al. | |
| 6,797,357 B2 | 9/2004 | Fereshtehkhou et al. | |
| 6,849,685 B2 | 2/2005 | Soerens et al. | |
| 6,884,494 B1 | 4/2005 | Curro et al. | |
| 6,946,413 B2 | 9/2005 | Lange et al. | |
| 7,037,569 B2 | 5/2006 | Curro et al. | |
| 7,270,861 B2 | 9/2007 | Broering et al. | |
| 7,312,286 B2 | 12/2007 | Lang et al. | |
| 7,335,713 B2 | 2/2008 | Lang et al. | |
| 7,614,812 B2 | 11/2009 | Reddy et al. | |
| 7,651,290 B2 | 1/2010 | Bauer et al. | |
| 7,691,760 B2 | 4/2010 | Bergsten et al. | |
| 7,704,313 B2 | 4/2010 | Ohlhausen et al. | |
| 7,722,589 B2 | 5/2010 | Fitts, Jr. et al. | |

(56) References Cited

U.S. PATENT DOCUMENTS

| | | | |
|---|---|---|---|
| 7,767,058 B2 | 8/2010 | Walton et al. | |
| 8,066,444 B2 | 11/2011 | Rippl et al. | |
| 8,198,200 B2 * | 6/2012 | Autran | A61F 13/15203 |
| | | | 442/328 |
| 8,241,543 B2 | 8/2012 | O'Donnell et al. | |
| 8,282,776 B2 | 10/2012 | Smith et al. | |
| 8,361,913 B2 | 1/2013 | Siqueira et al. | |
| 8,603,281 B2 | 12/2013 | Welch et al. | |
| 8,921,474 B2 | 12/2014 | Alper et al. | |
| 9,226,629 B2 | 1/2016 | Gummow et al. | |
| 9,260,808 B2 | 2/2016 | Schmidt et al. | |
| 9,315,929 B2 | 4/2016 | Sheehan | |
| 9,826,876 B2 | 11/2017 | Yang et al. | |
| 2002/0127937 A1 | 9/2002 | Lange et al. | |
| 2002/0150610 A1 | 10/2002 | Kono et al. | |
| 2004/0048542 A1 * | 3/2004 | Thomaschefsky | D04H 1/4374 |
| | | | 442/389 |
| 2004/0121683 A1 | 6/2004 | Jordan et al. | |
| 2004/0131820 A1 | 7/2004 | Turner et al. | |
| 2005/0148260 A1 | 7/2005 | Kopacz et al. | |
| 2005/0160543 A1 * | 7/2005 | Catalfamo | A47L 17/00 |
| | | | 15/104.93 |
| 2006/0068167 A1 | 3/2006 | Keck et al. | |
| 2006/0083900 A1 | 4/2006 | Ashraf | |
| 2007/0049153 A1 | 3/2007 | Dunbar et al. | |
| 2008/0003910 A1 * | 1/2008 | Hughes | B32B 27/12 |
| | | | 442/327 |
| 2009/0036014 A1 | 2/2009 | Torres et al. | |
| 2009/0151748 A1 | 6/2009 | Ridehour | |
| 2009/0325447 A1 | 12/2009 | Austin et al. | |
| 2010/0196653 A1 | 8/2010 | Curro | |
| 2011/0250413 A1 * | 10/2011 | Lu | D04H 1/66 |
| | | | 428/196 |
| 2013/0126070 A1 | 5/2013 | Siqueira et al. | |
| 2013/0283557 A1 | 10/2013 | Gibis et al. | |
| 2015/0175793 A1 | 6/2015 | DeMarco et al. | |

OTHER PUBLICATIONS

Chinese Office Action and Search Report Corresponding to Application No. 201680066381 on Jan. 3, 2020.
International Search Report and Written Opinion PCT/US2016/044746, dated Nov. 8, 2016.
International Search Report and Written Opinion PCT/US2016/044746, dated May 23, 2017.

* cited by examiner

97

OIL ABSORBENT WIPING PRODUCT

RELATED APPLICATIONS

The present application claims priority to PCT International Patent Application No. PCT/US2016/044746, filed on Jul. 29, 2016, which claims priority to U.S. Provisional Application Ser. No. 62/315,714, filed on Mar. 31, 2016 and U.S. Provisional Application Ser. No. 62/261,652, filed on Dec. 1, 2015, all of which are incorporated herein by reference.

BACKGROUND

Various different types of materials are used to make wiping products, particularly disposable wiping products. For example, in the past, wiping products have been made from various different types of nonwoven materials. For instance, wet wipes have been made from hydroentangled webs or airlaid webs that contain both pulp fibers and synthetic fibers. Such products are relatively inexpensive to produce, making the products disposable.

In other applications, wiping products have also been made by joining different types of nonwoven materials together to form a laminate with a layered structure. These products can be prepared from synthetic nonwoven webs that are combined together through the use of an adhesive or through thermal bonding.

The above wiping products should meet minimum product standards for strength, moisture absorbency, size, flexibility, thickness, softness and texture. In the past, those skilled in the art have attempted to produce disposable wiping products that mimic a soft cloth-like feel while still maintaining acceptable strength and texture.

Although great advances in the art have been made in constructing disposable wiping products for use as wet wipes or for use in absorbing water or water-based solutions, problems have been experienced in producing a disposable wiping product capable of not only effectively wiping up oils, including greases, from hard surfaces but also absorbing these contaminates into the wiping product so that they are not later unintentionally released. In fact, many disposable wiping products are made from oleophobic products that fail to effectively wipe up and clean away oils and greases from hard surfaces. In addition, many disposable wiping products are made from materials that degrade when exposed to oil and greases. For example, many elastic materials may degrade and dissolve when contacted with petroleum oils.

Thus, a need currently exists for a disposable wiping product that has been designed and engineered to clean up oils and greases from a hard surface. A need also exists for a disposable wiping product capable of not only effectively wiping up oils and greases, but also capable of storing and/or absorbing the oils and greases within the interior of the product.

SUMMARY

In general, the present disclosure is directed to a high capacity three-dimensional cleaning product that is particularly well suited for not only wiping up oils and greases, but for absorbing the oils and greases into the interior of the product. In particular, once the oils and greases contact the wiping product, the contaminants are adsorbed and/or absorbed into the interior pores of the product and, in one embodiment, absorbed by an interior elastic layer. In one embodiment, the wiping product is manufactured and packaged as a dry product for conveniently wiping up oil spills and then later disposed.

For example, in one embodiment, the present disclosure is directed to a dry wiper for picking up oily substances. The dry wiper comprises a first nonwoven outer layer containing synthetic fibers, a second nonwoven outer layer also containing synthetic fibers, and an oleophilic elastic layer positioned in between the first nonwoven outer layer and the second nonwoven outer layer.

In one embodiment, the first outer layer and the second outer layer are stretch bonded to the elastic layer to form a laminate such that the laminate has a "stretch-to-stop" at a force of 2000 grams of at least about 30% in one direction, such as at least about 35% in one direction, such as at least about 40% in one direction, such as at least about 45% in one direction, such as at least about 50% in one direction. The stretch-to-stop of the laminate is generally less than about 300%, such as less than about 200%, such as less than about 150%. The first outer layer and/or the second outer layer can also be stretch bonded to the elastic layer such that the first outer layer and/or the second outer layer forms a gathered layer that has a basis weight ratio of greater than about 1.2, such as greater than about 1.3, such as greater than about 1.4, such as greater than about 1.5. As used herein, the basis weight ratio is the basis weight of the outer layer once incorporated into the laminate and gathered divided by the basis weight of the outer layer in a flat state.

In one embodiment, the outer layers are stretch bonded to the elastic layer according to a bond pattern that occupies from about 3% to about 25% of the surface area of the elastic layer. In one embodiment, the bond pattern forms at least one pleated area on the wiper product defined by a plurality of parallel folds formed into one of the outer layers. At least certain of the pleats can have a pleat amplitude of greater than about 300 microns, such as greater than about 400 microns, such as greater than about 500 microns, such as greater than about 600 microns. The pleat amplitude is generally less than about 1500 microns, such as less than about 1000 microns. Within the pleated area, the pleat frequency can be from about 0.5 pleats per millimeter to about 8 pleats per millimeter, such as from about 0.8 pleats per millimeter to about 2 pleats per millimeter.

As described above, the dry wiper product of the present disclosure is particularly well suited for adsorbing and/or absorbing oils and greases. For instance, the dry wiper can have an oil absorbency of at least 8 grams of oil per gram of wipe, such as at least 9 grams of oil per gram of wipe, such as at least 10 grams of oil per gram of wipe, such as at least 11 grams of oil per gram of wipe, such as at least 12 grams of oil per gram of wipe. The oil absorbency is generally less than about 50 grams of oil per gram of wipe, such as less than about 30 grams of oil per gram of wipe, such as less than about 25 grams of oil per gram of wipe.

In one embodiment, the elastic layer contains a thermoplastic elastomer that is oleophilic and capable of absorbing oil. For instance, in one embodiment, the elastic layer can absorb at least 2 times, such as at least 2.5 times, such as at least 3 times, such as at least 3.5 times, such as at least 4 times its weight in oil. The thermoplastic elastomer can have an oil absorbency of greater than about 0.7 g/g, such as greater than about 0.8 g/g, such as greater than about 0.9 g/g, such as greater than about 1 g/g, such as greater than about 1.1 g/g, such as greater than about 1.2 g/g, such as greater than about 1.3 g/g after 24 hours. The oil absorbency is generally less than about 5 g/g. For example, the thermoplastic elastomer can include soft block segments that are substantially amorphous and capable of absorbing oil spaced apart from hard block segments that are semi-crystalline. The thermoplastic elastomer, for instance, can include a crystalline portion and an amorphous portion wherein the crystalline portion comprises from about 3% to about 25% of the elastomer, such as from about 5% to about 20% of the elastomer. In one embodiment, the elastic layer may comprise an elastic film. The film can be a continuous, non-apertured film in one embodiment. Thus, in addition to absorbing oil, the elastic layer can also serve as a barrier layer to prevent contaminants from contacting the hand of the user. In an alternate embodiment, the film can be an apertured film. In another embodiment, the fil can comprise a nonwoven elastic.

The first nonwoven outer layer and the second nonwoven outer layer may both comprise spunbond webs. In one embodiment, the first nonwoven outer layer may comprise a spunbond web while the second nonwoven outer layer may comprise a meltblown web or a coform web. The first nonwoven outer layer may comprise synthetic fibers that have a relatively large fiber size, such as by having a denier of greater than about 1, such as greater than about 2, such as greater than about 2.2, such as greater than about 2.5. The denier of the synthetic fibers is generally less than about 8, such as less than about 6. In an alternative embodiment, the first nonwoven outer layer may comprise synthetic fibers with a relatively small fiber size, such as by having a denier of less than about 2.0, such as less than about 1.5, such as less than about 1, such as less than about 0.75, such as less than about 0.5.

In one embodiment, the dry wiper of the present disclosure can be cut into individual sheets and stacked. A plurality of the wipers can then be placed into an outer package. The outer package, for instance, can be made from a polymer film.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
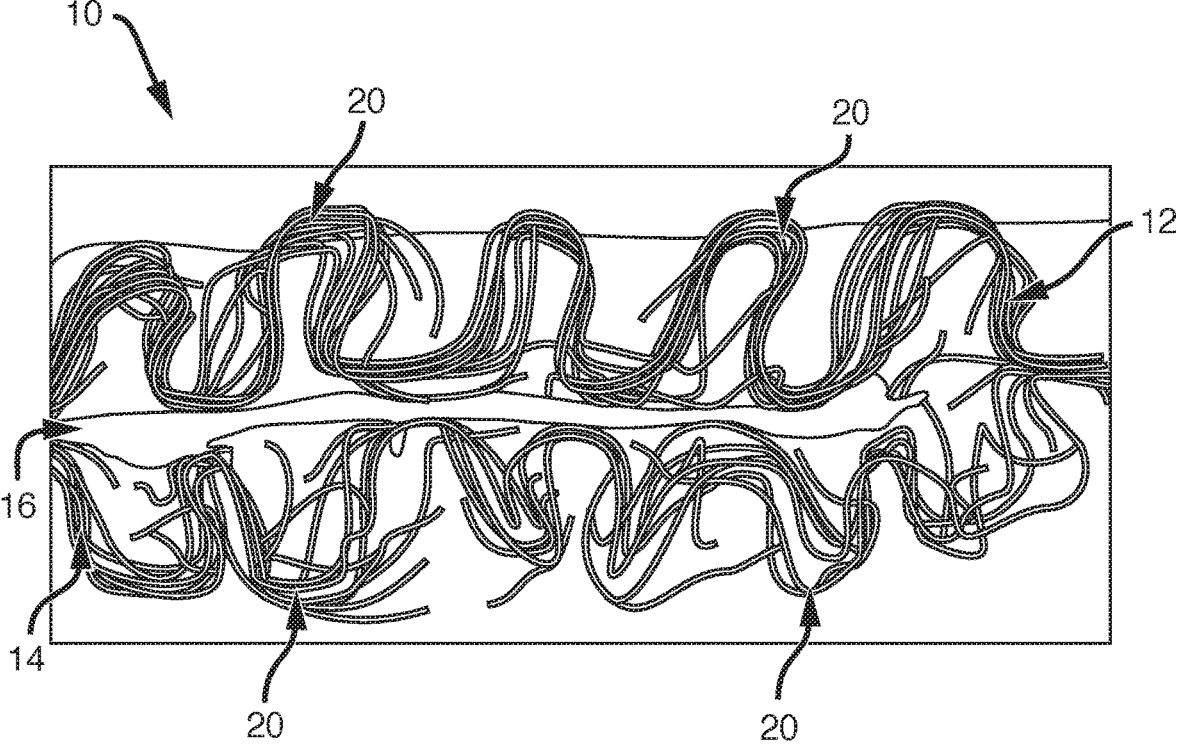
FIG. 1 is an enlarged cross-sectional view of one embodiment of a wiper made in accordance with the present disclosure.

Repeat use of reference characters in the present specification and drawings is intended to represent the same or analogous features or elements of the present invention.

4

DETAILED DESCRIPTION OF REPRESENTATIVE EMBODIMENTS

Definitions

As used herein the term "nonwoven web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, bonded carded webs, airlaid webs, coform webs, hydraulically entangled webs, and so forth.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 microns in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 microns, and are often between about 5 to about 20 microns.

As used herein, the term "coform" means a non-woven composite material of air-formed matrix material comprising thermoplastic polymeric meltblown fibers such as, for example, microfibers having an average fiber diameter of less than about 10 microns, and a multiplicity of individualized absorbent fibers such as, for example, wood pulp fibers disposed throughout the matrix of polymer microfibers and engaging at least some of the microfibers to space the microfibers apart from each other. The absorbent fibers are interconnected by and held captive within the matrix of microfibers by mechanical entanglement of the microfibers with the absorbent fibers, the mechanical entanglement and interconnection of the microfibers and absorbent fibers alone forming a coherent integrated fibrous structure. These materials are prepared according to the descriptions in U.S. Pat. No. 4,100,324 to Anderson et al. U.S. Pat. No. 5,508,102 to Georger et al. and U.S. Pat. No. 5,385,775 to Wright.

As used herein, the terms "machine direction" or "MD" generally refers to the direction in which a material is produced. The term "cross-machine direction" or "CD" refers to the direction perpendicular to the machine direction.

As used herein, the terms "necked" and "necked material" generally refer to any material that has been drawn in at least one dimension (e.g., machine direction) to reduce its transverse dimension (e.g., cross-machine direction) so that when the drawing force is removed, the material may be pulled back to its original width. The necked material generally has a higher basis weight per unit area than the un-necked material. When the necked material is pulled back to its original width, it should have about the same basis weight as the un-necked material. This differs from the orientation of a film in which the film is thinned and the basis weight is reduced. The necking method typically involves unwinding a material from a supply roll and passing it through a brake nip roll assembly driven at a given linear speed. A take-up roll or nip, operating at a linear speed higher than the brake nip roll, draws the material and generates the tension needed to elongate and neck the material.

Conventionally, "stretch bonded" refers to an elastic member being bonded to another member while the elastic member is extended at least about 25 percent of its relaxed length. "Stretch bonded laminate" refers to a composite material having at least two layers in which one layer is a gatherable layer and the other layer is an elastic layer. The layers are joined together when the elastic layer is in an extended condition so that upon relaxing the layers, the gatherable layer is gathered. Such a multilayer composite elastic material may be stretched to the extent that the nonelastic material gathered between the bond locations allows the elastic material to elongate.

Conventionally, "neck bonded" refers to an elastic member being bonded to a non-elastic member while the non-elastic member is extended and necked. "Neck bonded laminate" refers to a composite material having at least two layers in which one layer is a necked, non-elastic layer and the other layer is an elastic layer. The layers are joined together when the non-elastic layer is in an extended and necked condition.

Conventionally, "necked stretch bonded" refers to an elastic member being bonded to a non-elastic member while the non-elastic member is extended and necked and the elastic member is at least extended. "Necked stretch bonded laminate" refers to a composite material having at least two layers in which one layer is a necked, non-elastic layer and the other layer is a stretched, and sometimes necked, elastic layer. The layers are joined together when in their extended (and necked) conditions.

As used herein the terms "extensible" or "extensibility" generally refers to a material that stretches or extends in the direction of an applied force by at least about 25%, in some embodiments about 50%, and in some embodiments, at least about 75% of its relaxed length or width. An extensible material does not necessarily have recovery properties. For example, an elastomeric material is an extensible material having recovery properties. A meltblown web may be extensible, but not have recovery properties, and thus, be an extensible, non-elastic material.

As used herein, the term "elastomeric" and "elastic" and refers to a material that, upon application of a stretching force, is stretchable in at least one direction (such as the CD direction), and which upon release of the stretching force, contracts/returns to approximately its original dimension. For example, a stretched material may have a stretched length that is at least 50% greater than its relaxed unstretched length, and which will recover to within at least 50% of its stretched length upon release of the stretching force. A hypothetical example would be a one (1) inch sample of a material that is stretchable to at least 1.50 inches and which, upon release of the stretching force, will recover to a length of not more than 1.25 inches. Desirably, the material contracts or recovers at least 50%, and even more desirably, at least 80% of the stretched length.

As used herein, the term "thermal point bonding" generally refers to a process performed, for example, by passing a material between a patterned roll (e.g., calender roll) and another roll (e.g., anvil roll), which may or may not be patterned. One or both of the rolls are typically heated. As used herein, the term "ultrasonic bonding" generally refers to a process performed, for example, by passing a material between a sonic horn and a patterned roll (e.g., anvil roll). For instance, ultrasonic bonding through the use of a stationary horn and a rotating patterned anvil roll is described in U.S. Pat. No. 3,939,033 to Grgach, et al., U.S. Pat. No. 3,844,869 to Rust Jr., and U.S. Pat. No. 4,259,399 to Hill, which are incorporated herein in their entirety by reference thereto for all purposes. Moreover, ultrasonic bonding through the use of a rotary horn with a rotating patterned anvil roll is described in U.S. Pat. No. 5,096,532 to Neuwirth, et al., U.S. Pat. No. 5,110,403 to Ehlert, and U.S. Pat. No. 5,817,199 to Brennecke, et al., which are incorporated herein in their entirety by reference thereto for all purposes. Of course, any other ultrasonic bonding technique may also be used in the present invention.

As used herein "dry" means that the substrate contains less than about 10 percent water as tested under ASTM D1744-92 entitled "Standard Test Method for Determination of Water in Liquid Petroleum Products by Karl Fischer Reagent" modified as follows: A 500 milligram±100 milligram sample is cut from the substrate and weighed on an analytical balance to the nearest 0.1 milligram. Adjust the size of the sample as needed to obtain the specified sample weight. Introduce the sample to the titration vessel and stir approximately 5 minutes to extract the water from the sample. After stirring the sample, titrate as described in the above test procedure and calculate the percent water as described in the above test procedure.

DETAILED DESCRIPTION

Reference now will be made in detail to various embodiments of the invention, one or more examples of which are set forth below. Each example is provided by way of explanation, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations.

In general, the present disclosure is directed to a wiping product well suited to wiping away and absorbing oils, such as petroleum oils, petroleum-based oils and greases, silicone oils and greases, vegetable-based oils and fats, animal-based oils and fats, and human skin oils such as face oils. The wiping product of the present disclosure, in one embodiment, may be suited to wiping away and absorbing spills, such as spills of beverages and foods with oil and grease contents. In some embodiments, the wiping product of the present disclosure may be suited to wiping away and absorbing organic solvents that may be present in the oil and/or grease components. In accordance with the present disclosure, the wiper comprises a laminate containing at least two layers, such as three layers. In one embodiment, for instance, the wiper includes a middle elastic layer stretch bonded to two outer layers while in a stretched state. Stretching the elastic layer during causes the outer layers to gather into a desired configuration that forms void space on the interior of the wiper. Bonding the layers together in a stretched state also allows the elastic layer to extend and retract giving the wiper form-fitting properties, a flexible feel, and a soft hand. The outer layers of the wiper are designed to wipe away oils, greases and other contaminants. In one embodiment, for instance, the outer layers are designed to adsorb oily deposits. The middle elastic layer, on the other hand, is comprised of an oleophilic material. Thus, the middle layer absorbs oily substances and retains them within the wiper.

Thus, the wiper of the present disclosure has a three-dimensional conformation. The wiper not only has two external wiping surfaces but can also have built-in internal functional surfaces. These internal functional surfaces can help to form oil and contaminant storage reservoirs so that the wiper has high oil absorbency and retention capacity. As will be described in greater detail below, the exterior layers of the wiping product can also have built-in microscrubbers to further assist in wiping adjacent surfaces.

In contrast, commercially available flat two-dimensional wipes, regardless of their fiber types and manufacturing methods, are not capable of effectively bringing high viscose oils and solid contaminants into the interior pores of the wipes. In comparison to the wipers of the present disclosure, flat wipes allow contaminants and oily substances to accumulate on their surfaces, which often leads to repositing of the contaminants back onto the surface to be cleaned.

When made from three different layers, the wiper of the present disclosure has a total of six functional surfaces. Each surface can be designed to offer one or more particular functions. The outer surfaces, for instance, can be designed to adsorb oils while the remaining surfaces can be used to capture the oils and maintain the contaminants within the wiper. For example, the three-dimensional structure of the present disclosure produces a wiper having built-in soil storage valleys and void hills. The valleys can be formed on the external surfaces while the void hills are defined by the internal surfaces.

In accordance with the present disclosure, the middle, elastic layer is formed from a thermoplastic elastomer that is oleophilic. For example, the elastic layer can be formed from a thermoplastic elastomer capable of absorbing oils. In addition, the middle elastic layer can also be constructed so that the layer does not degrade or otherwise dissolve when contacted with oils. In this regard, a thermoplastic elastomer can be selected that has a particular molecular and macro-structure that makes the elastomer well suited for use in the wiper of the present disclosure.

In one embodiment, for instance, the thermoplastic elastomer contained in the middle layer comprises a thermoplastic elastomer having hard block segments separated from soft block segments. The hard block segments, for instance, can be semi-crystalline, while the soft block segments can be amorphous. The hard block segments, for instance, can facilitate oil wetting and wicking and also maintain the structure of the layer. The soft block segments, on the other hand, can be oleophilic and can freely absorb and retain oils, greases and other contaminants. In one embodiment, a thermoplastic elastomer is selected that has just enough hard block segments in order for the middle layer to maintain its form and not let the middle layer dissolve or turn into a gel when exposed to excess oil while maximizing oil absorption. For example, the thermoplastic elastomer can contain hard block segments in an amount less than about 50% by weight, such as in an amount less than about 40% by weight, such as in an amount less than about 30% by weight, such as in an amount less than about 20% by weight. The hard block segments are generally present in an amount greater than 2% by weight, such as in an amount greater than about 5% by weight. In general, the thermoplastic elastomer can be less than about 30% crystalline, such as less than about 25% crystalline, such as less than about 20% crystalline, such as less than about 15% crystalline, such as less than about 12% crystalline, such as even less than about 10% crystalline. The crystallinity of the thermoplastic elastomer is generally greater than about 2%, such as greater than about 4%, such as greater than about 5%.

In general, in order for a material to qualify as a thermoplastic elastomer, the material must have these three characteristics: 1) the ability to be stretched to moderate elongations and, upon the removal of stress, return to something close to its original shape; 2) the material can be processed as a melt at elevated temperature; and 3) there is an absence of significant creep.

There are six generic classes of commercial thermoplastic elastomers ("TPEs") which are: 1) styrenic block copolymers ("TPE-s"); 2) polyolefin blends ("TPE-o"); 3) elastomeric alloys ("TPE-v" or "TPV"); 4) thermoplastic polyurethanes ("TPU"); 5) thermoplastic copolyesters; and 6) thermoplastic polyamides.

Referring to FIG. 1, one embodiment of a wiper 10 made in accordance with the present disclosure is shown. As illustrated, the wiper 10 includes a first nonwoven outer layer 12 and a second nonwoven outer layer 14. The wiper further includes an elastic layer 16 positioned in between the first outer layer 12 and the second outer layer 14. In the embodiment illustrated, the elastic layer 16 comprises a film. In other embodiments, however, the elastic layer 16 may comprise a nonwoven elastic layer. In one embodiment, however, the middle layer 16 comprises a continuous film that is non-apertured. In this embodiment, the film serves as a barrier to prevent oil, greases and contaminants from contacting the hands of the user. In an alternate embodiment, the middle layer 16 may comprise an apertured film.

In one embodiment, the wiper 10 is constructed such that the layers are bonded together while the elastic layer is in a stretched state. In particular, the first outer layer 12 and the second outer layer 14 can be bonded to the elastic layer 16 while the elastic layer 16 is stretched in at least one direction. After bonding, the elastic layer 16 retracts causing the first outer layer 12 and the second outer layer 14 to gather. The manner in which the outer layers gather depends upon the amount the elastic layer is stretched and the bond pattern used to form the laminate.

In one embodiment, the wiper 10 is constructed such that the layers are stretch bonded, neck bonded, or neck stretch bonded together. In particular, the first outer layer 12 and the second outer layer 14 can be bonded to the elastic layer 16 while one or both of the outer layers 12 and 14 are extended and/or necked.

In one embodiment, a bond pattern is used that forms at least one pleated area on the wiper as shown in FIG. 1. For example, the first outer layer 12 and/or the second outer layer 14 can form pleats 20 that have a pleat amplitude and a pleat frequency.

The pleat amplitude is the distance from the peak of a pleat to an adjacent valley. In one embodiment, at least certain of the pleats formed in the wiper have a pleat amplitude of greater than about 300 microns, such as greater than about 400 microns, such as greater than about 500 microns, such as greater than about 600 microns, such as greater than about 700 microns, such as even greater than about 800 microns. The pleat amplitude is generally less than about 2000 microns, such as less than about 1500 microns, such as less than about 1200 microns.

The pleat frequency within the pleated area is the number of pleats per millimeter. In general, the pleat frequency is greater than about 0.5 pleats per mm, such as greater than about 1 pleat per mm, such as greater than about 1.5 pleats per mm, such as greater than about 2 pleats per mm, such as greater than about 2.5 pleats per mm, such as greater than about 3 pleats per mm, such as greater than about 3.5 pleats per mm, such as greater than about 4 pleats per mm. The pleat frequency is generally less than about 10 pleats per mm, such as less than about 8 pleats per mm, such as less than about 6 pleats per mm, such as less than about 4 pleats per mm.

As described above, the wiper of the present disclosure generally contains an elastic layer laminated to at least one facing layer or outer layer. In one embodiment, the elastic layer is stretch bonded to a first outer or face layer and to a second outer or face layer. Each of the layers is discussed in greater detail below.

I. Elastic Layer

The elastic layer of the present disclosure is formed from one or more elastomeric polymers that are melt-processable, i.e. thermoplastic. In accordance with the present disclosure, the elastic layer contains a thermoplastic elastomer that is oleophilic. For instance, a thermoplastic elastomer can be selected that is highly oil absorbent. As described above, the thermoplastic elastomer is generally semi-crystalline so that the elastomer does not degrade and dissolve when contacted with oily substances. The crystalline portion of the polymer, however, is minimized in order to maximize oil absorption.

The elastic layer can be in the form of nonwoven or a film. In one embodiment, the elastic layer comprises a nonwoven elastic layer. For example, in one particular embodiment, the nonwoven elastic layer may comprise a meltblown web. Alternately, in one embodiment, the elastic layer comprises a continuous and non-apertured film. In an alternate embodiment, the elastic layer comprises an apertured film.

Semi-crystalline polyolefins have or are capable of exhibiting a substantially regular structure. For example, semi-crystalline polyolefins may be substantially amorphous in their undeformed state, but form crystalline domains upon stretching. The degree of crystallinity of the olefin polymer may be from about 3% to about 30%, in some embodiments from about 5% to about 25%, and in some embodiments, from about 5% and about 15%. Likewise, the semi-crystalline polyolefin may have a latent heat of fusion (AK), which is another indicator of the degree of crystallinity, of from about 15 to about 75 Joules per gram ("J/g"), in some embodiments from about 20 to about 65 J/g, and in some embodiments, from 25 to about 50 J/g. The semi-crystalline polyolefin may also have a Vicat softening temperature of from about 10° C. to about 100° C., in some embodiments from about 20° C. to about 80° C., and in some embodiments, from about 30° C. to about 60° C. The semi-crystalline polyolefin may have a melting temperature of from about 20° C. to about 120° C., in some embodiments from about 35° C. to about 90° C., and in some embodiments, from about 40° C. to about 80° C. The latent heat of fusion (AK) and melting temperature may be determined using differential scanning calorimetry ("DSC") in accordance with ASTM D-3417 as is well known to those skilled in the art. The Vicat softening temperature may be determined in accordance with ASTM D-1525.

Exemplary semi-crystalline polyolefins include polyethylene, polypropylene, blends and copolymers thereof. In one particular embodiment, a polyethylene is employed that is a copolymer of ethylene and an $\alpha$-olefin, such as a $C_3$-$C_{20}$ $\alpha$-olefin or $C_3$-$C_{12}$ $\alpha$-olefin. The $\alpha$-olefin and ethylene copolymer may comprise a random copolymer or a block copolymer. Block copolymers, for instance, have been found to unexpectedly and dramatically absorb great amounts of oil when incorporated into wipers made according to the present disclosure.

Suitable $\alpha$-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired $\alpha$-olefin comonomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole. The $\alpha$-olefin content may likewise range from about 1 mole % to about 40 mole %, in some embodiments from about 1.5 mole % to about 15 mole %, and in some embodiments, from about 2.5 mole % to about 13 mole %.

The density of the polyethylene may vary depending on the type of polymer employed, but generally ranges from 0.85 to 0.96 grams per cubic centimeter ("g/cm$^3$"). Polyethylene "plastomers", for instance, may have a density in the range of from 0.85 to 0.91 g/cm$^3$. Likewise, "linear low density polyethylene" ("LLDPE") may have a density in the range of from 0.91 to 0.940 g/cm$^3$; "low density polyethylene" ("LDPE") may have a density in the range of from 0.910 to 0.940 g/cm$^3$; and "high density polyethylene" ("HDPE") may have density in the range of from 0.940 to 0.960 g/cm$^3$. Densities may be measured in accordance with ASTM 1505.

Particularly suitable polyethylene copolymers are those that are "linear" or "substantially linear." The term "substantially linear" means that, in addition to the short chain branches attributable to comonomer incorporation, the ethylene polymer also contains long chain branches in that the polymer backbone. "Long chain branching" refers to a chain length of at least 6 carbons. Each long chain branch may have the same comonomer distribution as the polymer backbone and be as long as the polymer backbone to which it is attached. Preferred substantially linear polymers are substituted with from 0.01 long chain branch per 1000 carbons to 1 long chain branch per 1000 carbons, and in some embodiments, from 0.05 long chain branch per 1000 carbons to 1 long chain branch per 1000 carbons. In contrast to the term "substantially linear", the term "linear" means that the polymer lacks measurable or demonstrable long chain branches. That is, the polymer is substituted with an average of less than 0.01 long chain branch per 1000 carbons.

The density of a linear ethylene/α-olefin copolymer is a function of both the length and amount of the α-olefin. That is, the greater the length of the α-olefin and the greater the amount of α-olefin present, the lower the density of the copolymer.

Propylene polymers may also be suitable for use in the elastic layer. Suitable elastomeric propylene polymers may include, for instance, copolymers or terpolymers of propylene include copolymers of propylene with an α-olefin (e.g., $C_3$-$C_{20}$), such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, and in some embodiments, from about 2 wt. % to about 10 wt. %. Preferably, the density of the polypropylene (e.g., propylene/ℓ -olefin copolymer) may be 0.91 grams per cubic centimeter (g/cm³) or less, in some embodiments, from 0.85 to 0.88 g/cm³, and in some embodiments, from 0.85 g/cm³ to 0.87 g/cm³.

Any of a variety of known techniques may generally be employed to form the semi-crystalline polyolefins. For instance, olefin polymers may be formed using a free radical or a coordination catalyst (e.g., Ziegler-Natta). The olefin polymer can also be formed from a single-site coordination catalyst, such as a metallocene catalyst. Such a catalyst system produces ethylene copolymers in which the comonomer is randomly distributed within a molecular chain and uniformly distributed across the different molecular weight fractions. Examples of metallocene catalysts include bis(n-butylcyclopentadienyl)titanium dichloride, bis(n-butylcy-clopentadienyl)zirconium dichloride, bis(cyclopentadienyl) scandium chloride, bis(indenyl)zirconium dichloride, bis (methylcyclopentadienyl)titanium dichloride, bis (methylcyclopentadienyl)zirconium dichloride, cobaltocene, cyclopentadienyltitanium trichloride, ferro-cene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers (Mw/Mn) of below 4, controlled short chain branching distribution, and controlled isotacticity.

The melt flow index (Ml) of the semi-crystalline polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 5000 grams in 10 minutes at 190° C., and may be determined in accordance with ASTM Test Method D1238-E.

Other thermoplastic polymers may also be used to form the elastic layer, either alone or in conjunction with the semi-crystalline polyolefins. For instance, a semi-crystalline block copolymer may be employed that has at least two blocks of a monoalkenyl arene polymer separated by at least one block of a saturated conjugated diene polymer. The monoalkenyl arene blocks may include styrene and its analogues and homologues, such as o-methyl styrene; p-methyl styrene; p-tert-butyl styrene; 1,3 dimethyl styrene p-methyl styrene; etc., as well as other monoalkenyl poly-cyclic aromatic compounds, such as vinyl naphthalene; vinyl anthrycene; and so forth. Preferred monoalkenyl arenes are styrene and p-methyl styrene. The conjugated diene blocks may include homopolymers of conjugated diene monomers, copolymers of two or more conjugated dienes, and copolymers of one or more of the dienes with another monomer in which the blocks are predominantly conjugated diene units. Preferably, the conjugated dienes contain from 4 to 8 carbon atoms, such as 1,3 butadiene (butadiene); 2-methyl-1,3 butadiene; isoprene; 2,3 dimethyl-1,3 butadiene; 1,3 pentadiene (piperylene); 1,3 hexadiene; and so forth.

The amount of monoalkenyl arene (e.g., polystyrene) blocks may vary, but typically constitute from about 5 wt. % to about 30 wt. %, in some embodiments from about 8 wt. % to about 25 wt. %, and in some embodiments, from about 10 wt. % to about 18 wt. % of the copolymer. Suitable block copolymers may contain monoalkenyl arene endblocks hav-ing a number average molecular weight from about 5,000 to about 35,000 and saturated conjugated diene midblocks having a number average molecular weight from about 20,000 to about 170,000. The total number average molecu-lar weight of the block polymer may be from about 30,000 to about 250,000.

Particularly suitable thermoplastic elastomeric copoly-mers include styrene-isoprene-styrene block copolymers. Although the above block copolymers are oil absorbent, however, many of the above polymers may degrade or dissolve in oil. Styrene-based block copolymers that do not dissolve or degrade in oils, however, have lower oil absorp-tion characteristics.

The amount of elastomeric polymer(s) employed in the elastic layer may vary, but is typically about 30 wt. % or more of the layer, in some embodiments about 50 wt. % or more, and in some embodiments, about 80 wt. % or more of the of the layer. In one embodiment, for example, the semi-crystalline polyolefin(s) constitute about 70 wt. % or more of the layer, in some embodiments about 80 wt. % or more of the layer, and in some embodiments, about 90 wt. % or more of the layer. In other embodiments, blends of semi-crystalline polyolefin(s) and elastomeric block copo-lymer(s) may be employed. In such embodiments, the block copolymer(s) may constitute from about 5 wt. % to about 50 wt. %, in some embodiments from about 10 wt. % to about 40 wt. %, and in some embodiments, from about 15 wt.% to about 35 wt. % of the blend. Likewise, the semi-crystalline polyolefin(s) may constitute from about 50 wt. % to about 95 wt. %, in some embodiments from about 60 wt. % to about 90 wt. %, and in some embodiments, from about 65 wt. % to about 85 wt. % of the blend. It should of course be understood that other elastomeric and/or non-elastomeric polymers may also be employed in the film.

Besides polymers, the elastic layer may also contain other components. In one embodiment, for example, the elastic film contains a filler. Fillers are particulates or other forms of material that may be added to the film polymer extrusion blend and that will not chemically interfere with the extruded film, but which may be uniformly dispersed throughout the film. Fillers may serve a variety of purposes, including enhancing film opacity.

The fillers may have a spherical or non-spherical shape with average particle sizes in the range of from about 0.1 to about 7 microns. Examples of suitable fillers include, but are not limited to, calcium carbonate, various kinds of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives. A suitable coating, such as stearic acid, may also be applied to the filler particles if desired. When utilized, the filler content may vary, such as from about 1 wt. % to about 15 wt. %, in some embodiments, from about 2 wt. % to about 8 wt. %.

Other additives may also be incorporated into the film, such as melt stabilizers, processing stabilizers, heat stabilizers, light stabilizers, antioxidants, heat aging stabilizers, whitening agents, antiblocking agents, bonding agents, tackifiers, viscosity modifiers, etc. Examples of suitable tackifier resins may include, for instance, hydrogenated hydrocarbon resins. Moreover, bonding agents may also be added to the elastic layer to facilitate bonding of the film to additional materials (e.g., nonwoven web). When employed, such additives (e.g., tackifier, antioxidant, stabilizer, etc.) may each be present in an amount from about 0.001 wt. % to about 25 wt. %, in some embodiments, from about 0.005 wt. % to about 20 wt. %, and in some embodiments, from 0.01 wt. % to about 15 wt. % of the layer.

The basis weight of the elastic layer can vary depending upon various different factors. In general, the elastic layer has a basis weight of from about 1.5 gsm to about 120 gsm. For instance, the elastic layer can have a basis weight of less than about 100 gsm, such as less than about 80 gsm, such as less than about 60 gsm, such as less than about 40 gsm. The basis weight can be greater than about 1.5 gsm, such as For instance, a thermoplastic elastomer can be selected that can absorb greater than about 0.8 g/g of wipe, such as greater than about 1 g/g of wipe, such as greater than 1.1 g/g of wipe, such as greater than 1.2 g/g of wipe, such as even greater than 1.3 g of oil per g of elastic after contact with the oil for 24 hours. A thermoplastic elastomer can also be selected that has the above oil absorbency characteristics without degrading or dissolving.

For example, various elastomeric copolymers were tested for oil absorption. Samples of copolymer pellets, listed in Table 1 below, were melt pressed into films of similar thickness using a Carver Hot Plate press (Model 3895.4D10A00, Carver Inc., 159 Morris Street, Wabash, Ind. USA 46992). The press was set at 340° F. 1200lb pressure, and 1 minute dwell. Each sample film was formed using sheets of REYNOLDS aluminum foil and approximately 10 grams of pellets. Discs 4 cm in diameter, 1 mm in thickness, and with a weight of around 1.0 g were cut from these film samples. The discs were then weighed and placed into a 200 ml beaker containing 100 ml of 10W30 SAE30 VALVOLINE motor oil and left for 24 h, then 48 h and then 72 h. At each time point, the disc was removed from the oil, lightly blotted between paper towels using a hand roller, and reweighed. The disc was then placed back in the oil until the next time point.

The results shown in Table 1 below indicate the gram of oil/gram of copolymer (g/g), which is calculated as the weight of the oil absorbed by the disc divided by the weight of the original disc. As shown in the table, the styrene ethylene butylene styrene block copolymer; polyethylene; tackifying agent blend and the aminated ethylene-octene block copolymer sample had the highest oil absorption (g/g) at 24 hours.

TABLE 1

| Oil Absorption in gram of oil/gram of copolymer for elastomeric copolymers | | | |
|---|---|---|---|
| Sample | 24 hour g/g | 48 hour g/g | 72 hour g/g |
| Polypropylene polyethylene copolymer, 16% polyethylene (melt index of 1.4 g/10 min @ 190° C./2.16 kg) | 0.37 | 0.44 | 0.58 |
| Polypropylene polyethylene copolymer, 15% polyethylene (melt index of 9.1 g/10 min @ 190° C./2.16 kg | 0.19 | 0.48 | 0.63 |
| Styrene ethylene butylene styrene block copolymer, 30% styrene | 0.27 | 0.47 | 0.69 |
| Styrene-isoprene-styrene, 22% styrene | 0.31 | 0.46 | 0.58 |
| Styrene-isoprene-styrene, 28% styrene | 0.32 | 0.46 | 0.57 |
| Styrene-isoprene-styrene, 22% styrene | 0.33 | 0.49 | 0.61 |
| Ethylene octene block copolymer, 18% octane, 67 wt. % soft segment, 20% crystallinity (44.6 wt. % hard block) (melt index of 5 g/10 min @ 190° C./2.16 kg | 0.36 | 0.49 | 0.59 |
| Styrene-isoprene-styrene, 17% styrene | 0.38 | 0.58 | 0.77 |
| Ethylene octene block copolymer, (13.5% hard block) (0.866 g/cc) (5.0 (g/10 min @ 190° C./2.16 kg) | 0.50 | 0.85 | 1.15 |
| Styrene-isoprene-styrene, 14% styrene | 0.62 | 1.02 | 1.37 |
| Ethylene octene block copolymer, 18% octane, 89 wt. % soft segment, 7% crystallinity (melt index of 0.5 g/10 min @ 190° C./2.16 kg) | 0.82 | 1.27 | 1.68 |
| Ethylene octene block copolymer, (0.866 g/cc) (melt index of 1.0 g/10 min @ 190° C./2.16 kg) | 0.86 | 1.38 | 1.71 |
| Metallocene catalyzed ethylene/1-octene copolymer, 16% crystallinity (16 wt % hard block) (melt index of 1000 g/10 min @ 190° C./2.16 kg) | 1.03 | 1.10 | 1.10 |
| Aminated ethylene-octene block copolymer (0.866 g/cc) (melt index of 15 g/10 min @ 190° C./2.16 kg) | 1.37 | 2.04 | 2.36 |
| Styrene ethylene butylene styrene block copolymer; polyethylene; tackifying agent blend | 1.54 | 2.75 | 3.06 (dissolves) | greater than about 20 gsm, such as greater than about 25 gsm, such as greater than about 30 gsm.

As described above, the elastic layer is made from a thermoplastic elastomer that is oleophilic and can absorb oil.

Figure 7:
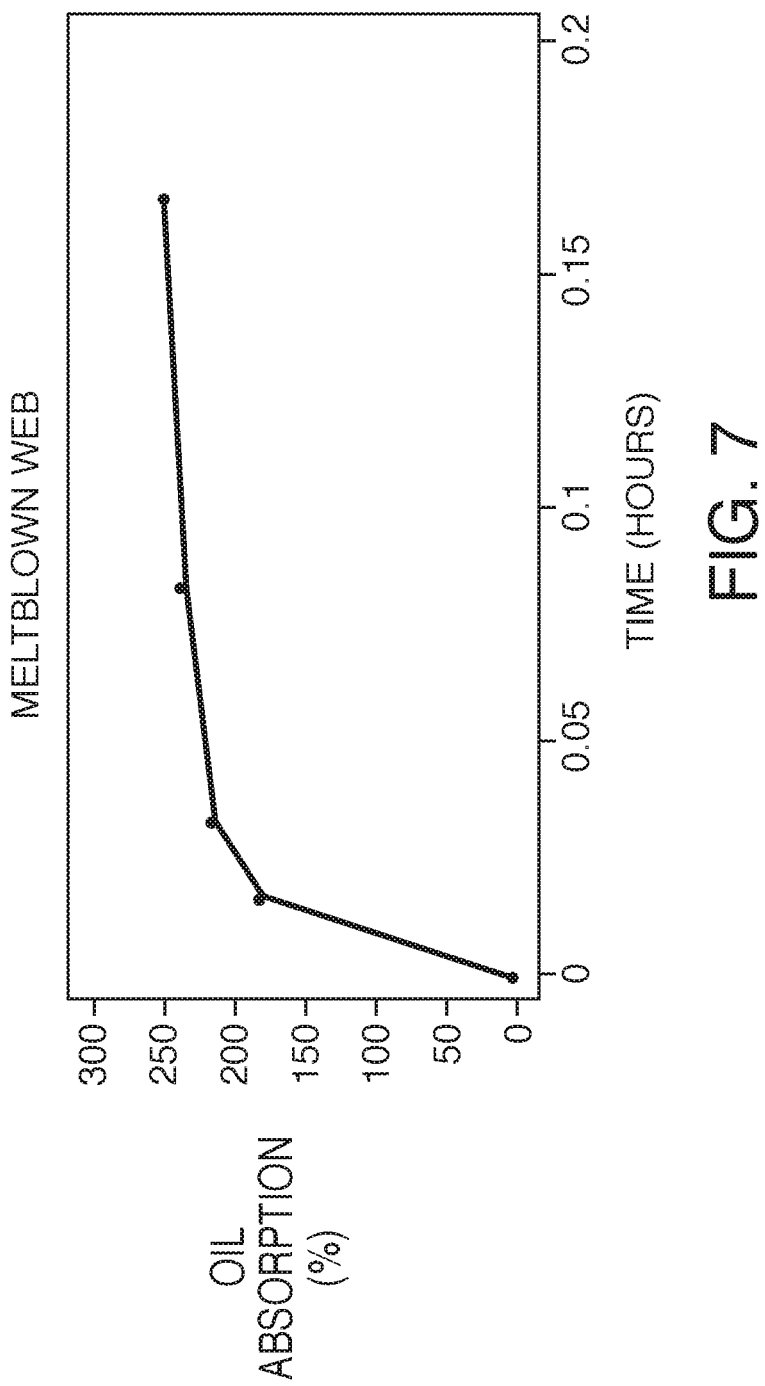
FIGS. 7-9 are graphical representations of the results in the examples below.

In addition to films, an elastomeric copolymer was formed into a meltblown web and tested for oil absorbency. An aminated ethylene-octene block copolymer (0.866 g/cc) was melt-processed into a meltblown nonwoven web of 218 gsm. A 4 cm disc samples were then weighed (0.35 g) and placed into motor oil (10W30) and then removed, blotted and reweighed after 1, 3, 6 minutes. FIG. 7 shows the very fast oil absorption kinetics by the meltblown sample. 250% absorption of oil by the meltblown was achieved in 10 minutes. The increased absorption is thought to be due to the higher surface area exposure to the oil.

Figure 8:
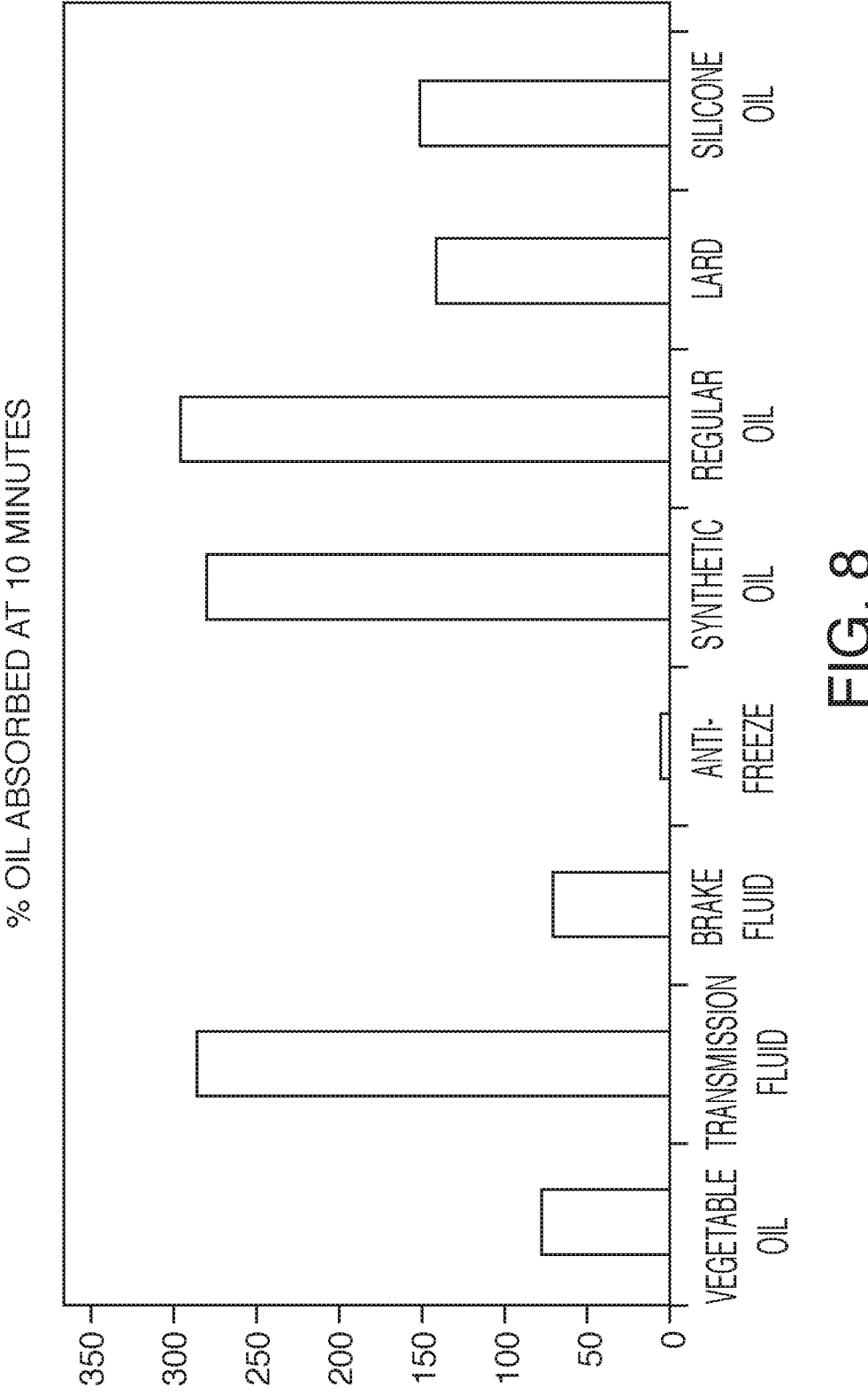

To further explore the capabilities of the nonwoven melt-blown web absorption of other fluids besides engine oil was tested. The meltblown web was tested for absorbency of vegetable oil, lard, transmission fluid, brake fluid, antifreeze, synthetic oil, silicone oil and regular oil. The results are shown in FIG. 8.

Figure 9:
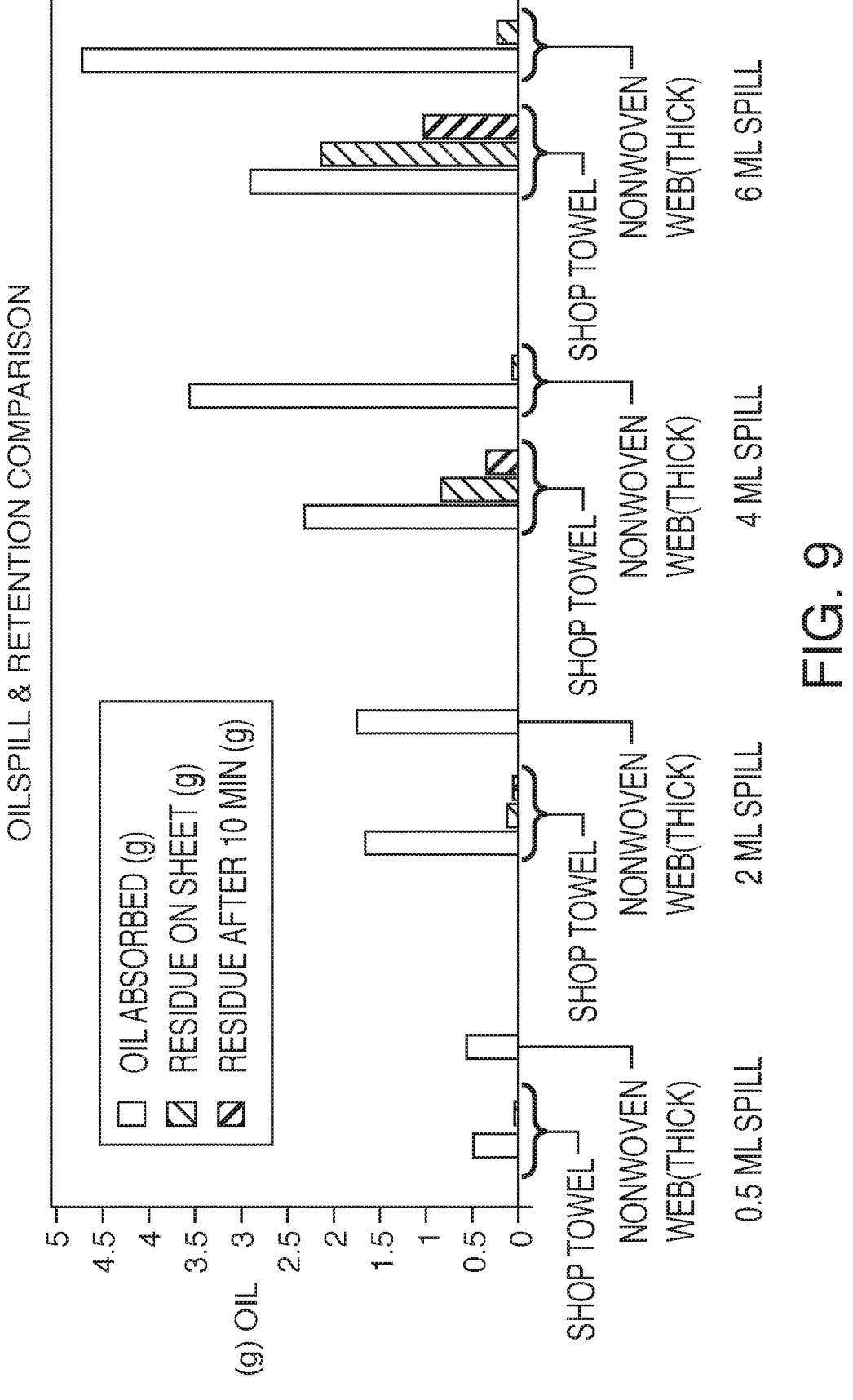

Retention abilities of the nonwoven meltblown web were also tested using an oil spill testing method. Oil spills of various sizes (0.5 mL to 6mL) were placed on a clean metal sheet, and samples of Kimberly-Clark Scott® Shop Towel and the nonwoven meltblown web were placed on the spill for 1 minute. The substrates were removed and weighed and the metal sheet was also weighed to see how much initial residue was left by each sample. The soiled samples were then placed on a clean metal sheet, and after 10 minutes, the sheet was weighed to calculate how much residue was left by the soiled wipe. The results are recorded in FIG. 9.

The nonwoven meltblown web consistently picks up more oil than the shop towel in all sized spills. Additionally, the performance gap grows between the meltblown web and the Shop Towel as the oil spill size also grows. Finally, the oleophilic properties of the meltblown web allows it to retain almost all of the oil it absorbs (only leaving 0.01 grams of residue after 10 minutes) as compared to the cellulose-based Scott® Shop Towel which leaves 1.1 grams of residue after 10 minutes.

II. Outer Layers

The wiper of the present disclosure can contain one or more outer layers. In one embodiment, for instance, the wiper contains two outer layers. Each outer layer is generally constructed from a nonwoven web or material. Nonwoven web materials that may be used in the present wiper include spunbond webs, meltblown webs, bonded carded webs, wetlaid webs, airlaid webs, coform webs, hydroentangled webs, as well as combinations of the foregoing.

In one embodiment, at least one of the outer layers comprises a spunbond web. It has been discovered that spunbond webs can be produced that have a pore size capable of efficiently wiping up or adsorbing oily substances into the interior of the wiper. Thus, in one embodiment, at least one of the outer layers comprises a spunbond web.

The other outer layer can comprise a spunbond web or can comprise another nonwoven web adapted for a particular purpose. For instance, in one embodiment, the other outer layer may comprise a meltblown web or a coform web. Meltblown webs and coform webs, for instance, may perform better than a spunbond web in a final wipe of the surface to produce a clean and dry surface after wiping. For instance, in one embodiment, the spunbond web can be used to initially wipe up oily substances while a meltblown outer layer or coform outer layer may be used as a final wiping step.

The outer layers can be made from various different polymers. Exemplary polymers for use in forming nonwoven web materials may include, for instance, polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; and so forth. If desired, biodegradable polymers, such as those described above, may also be employed. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. It should be noted that the polymer(s) may also contain other additives, such as processing aids or treatment compositions to impart desired properties to the fibers, residual amounts of solvents, pigments or colorants, and so forth.

Monocomponent and/or multicomponent fibers may be used to form the nonwoven web material. Monocomponent fibers are generally formed from a polymer or blend of polymers extruded from a single extruder. Multicomponent fibers are generally formed from two or more polymers (e.g., bicomponent fibers) extruded from separate extruders. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art and so forth.

Although any combination of polymers may be used, the polymers of the multicomponent fibers are typically made from thermoplastic materials with different glass transition or melting temperatures where a first component (e.g., sheath) melts at a temperature lower than a second component (e.g., core). Softening or melting of the first polymer component of the multicomponent fiber allows the multicomponent fibers to form a tacky skeletal structure, which upon cooling, stabilizes the fibrous structure. For example, the multicomponent fibers may have from about 20% to about 80%, and in some embodiments, from about 40% to about 60% by weight of the low melting polymer. Further, the multicomponent fibers may have from about 80% to about 20%, and in some embodiments, from about 60% to about 40%, by weight of the high melting polymer.

Fibers of any desired length may be employed, such as staple fibers, continuous fibers, etc. In one particular embodiment, for example, staple fibers may be used that have a fiber length in the range of from about 1 to about 150 millimeters, in some embodiments from about 5 to about 50 millimeters, in some embodiments from about 10 to about 40 millimeters, and in some embodiments, from about 10 to about 25 millimeters. Although not required, carding techniques may be employed to form fibrous layers with staple fibers as is well known in the art. For example, fibers may be formed into a carded web by placing bales of the fibers into a picker that separates the fibers. Next, the fibers are sent through a combing or carding unit that further breaks apart and aligns the fibers in the machine direction so as to form a machine direction-oriented fibrous nonwoven web. The carded web may then be bonded using known techniques to form a bonded carded nonwoven web.

A nonwoven web material may also contain an additional fibrous component such that it is considered a composite. For example, a nonwoven web may be entangled with another fibrous component using any of a variety of entanglement techniques known in the art (e.g., hydraulic, air, mechanical, etc.). In one embodiment, the nonwoven web is integrally entangled with cellulosic fibers using hydraulic entanglement. A typical hydraulic entangling process utilizes high pressure jet streams of water to entangle fibers to form a highly entangled consolidated fibrous structure, e.g., a nonwoven web. The hydroentangled web may contain pulp fibers in an amount less than about 50% by weight, such as less than about 40% by weight, such as in an amount less than about 30% by weight, such as in an amount less than about 20% by weight. The pulp fibers are generally present in the hydroentangled web in an amount greater than 5% by weight.

The basis weight of the nonwoven web material may generally vary, such as from about 5 grams per square meter ("gsm") to 45 gsm, in some embodiments from about 7 gsm to about 25 gsm, and in some embodiments, from about 8 gsm to about 15 gsm. When multiple nonwoven web materials, such materials may have the same or different basis weights.

The above basis weight ranges refer to the nonwoven web materials in a flat laid-out condition. When incorporated into the wiper and stretch bonded to the elastic layer, however, the outer layers gather thereby effectively increasing their basis weight on a weight per area basis. A basis weight ratio can be calculated by dividing the basis weight of the gathered outer layer divided by the basis weight of the outer layer prior to incorporation into the laminate. In accordance with the present disclosure, the basis weight ratio of one or more outer layers can be greater than about 1.5, such as greater than about 2, such as greater than about 3, such as greater than about 4, such as greater than about 5, such as greater than about 6, such as greater than about 7. The basis weight ratio is generally less than about 20, such as less than about 15, such as less than about 10.

The size of the fibers used to construct the outer layers can vary depending upon various factors. When the outer layer is used to wipe up oily spills or adsorb oily substances, in one embodiment, fibers can be used that have a relatively large size. Alternately, fibers can be used that have a relatively small to medium size. For instance, the fibers can have a denier of greater than about 0.1, such as greater than about 0.25, such as greater than about 0.5, such as greater than about 0.75, such as greater than about 1.0, such as greater than about 1.25, such as greater than about 1.5, such as greater than about 2.0, such as greater than about 2.2, such as greater than about 2.5, such as greater than about 2.7, such as greater than about 3. The denier of the fibers is generally less than about 8, such as less than about 6.

Figure 2:
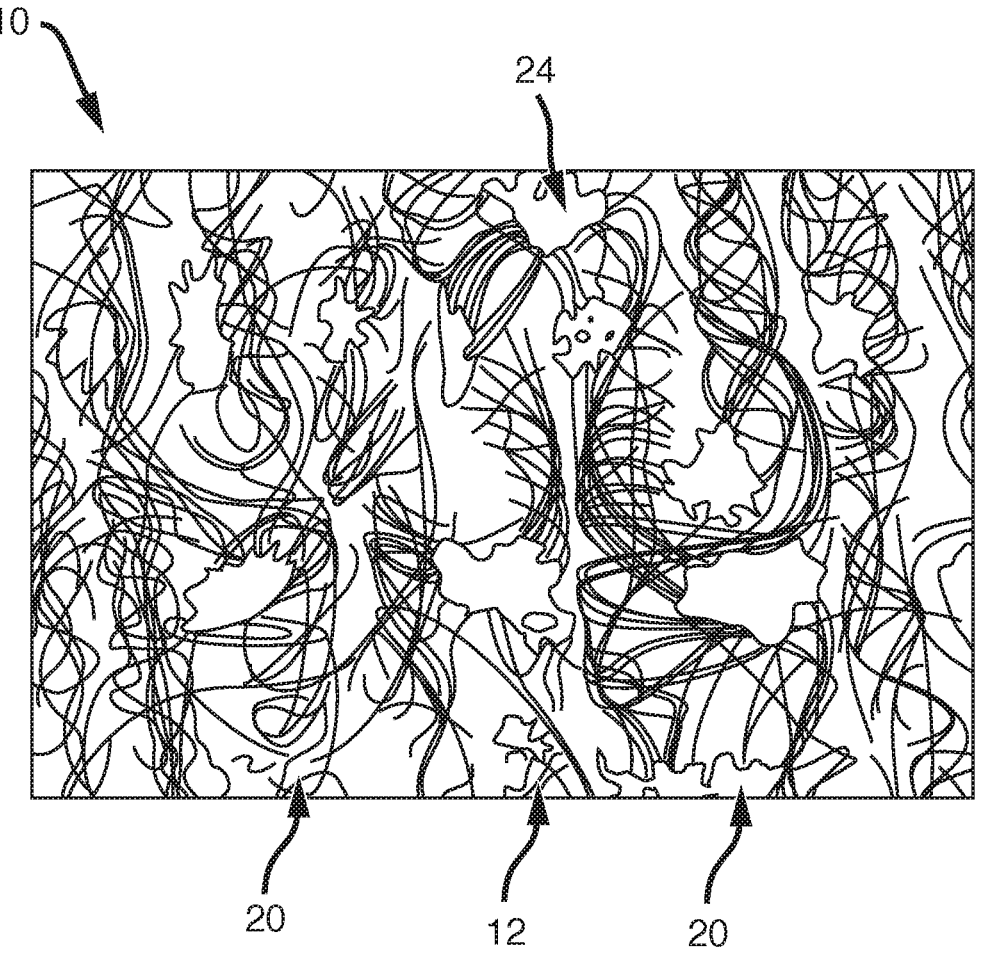
FIG. 2 is an enlarged top view of one embodiment of a wiper made in accordance with the present disclosure.

In one embodiment, one or more of the outer layers may include bonded areas within the nonwoven web that act as microscrubbers during use of the wiper. For example, referring to FIG. 2, a magnified top view of a wiper made in accordance with the present disclosure is shown. The wiper 10 includes a first outer layer 12 comprised of pleats 20. As shown, the outer layer 12 includes microscrubbers 24 comprising areas where the fibers have been thermally bonded together. The microscrubbers 24 can be formed through a thermal point bonding process prior to laminating the outer layer to the elastic layer. The microscrubbers 24 can occupy from about 2% to about 30% of the surface area of the outer layer. For instance, the microscrubbers can occupy greater than about 4%, such as greater than about 6% of the surface area of the outer layer. The microscrubbers generally occupy less than about 25%, such as less than about 20%, such as less than about 15%, such as less than about 12% of the surface area of the outer layer. The microscrubbers can have a greatest dimension of from about 1 micron to about 1000 microns, such as greater than about 100 microns, such as greater than about 300 microns, such as greater than about 500 microns. The largest dimension on the microscrubbers is generally less than about 900 microns, such as less than about 800 microns. In one embodiment, the microscrubbers 24 may comprise a pattern, such as a discrete or continuous pattern covering at least a portion of the surface area of the outer layer. In a further embodiment, the microscrubbers 24 may be configured such that they can absorb, wipe away, or lock down oils and greases.

In one embodiment, the nonwoven web material may necked in one or more directions prior to lamination. Alternatively, the nonwoven web may remain relatively inextensible in at least one direction prior to lamination. In such embodiments, the nonwoven web may be optionally stretched in one or more directions subsequent to lamination.

In one embodiment, one or more outer layers of the wiper may be configured for contact with a harsh surface, such as a bumpy or coarse surface. In another embodiment, one or more outer layers of the wiper may be configured to improve the scrubbing properties of the wiper or outer layer(s) thereof. For instance, in one particular embodiment, one or more outer layers of the wiper may be formed from spunbond or rigid fibers in order to improve harsh surface contact and scrubbing properties. In another embodiment, one or more outer layers of the wiper may be configured for contact with fine surfaces or for use in removing traces of oils and greases from a surface. For instance, one or more outer layers of the wiper may be formed from meltblown fibers or microfibers to improve the fine surface contact and trace oil removal properties.

III. Lamination Technique

Lamination is generally accomplished in the present disclosure via a patterned bonding technique in which the materials are supplied to a nip defined by at least one patterned roll. In one embodiment, the outer layers are laminated to the elastic layer using thermal bonding.

In one embodiment, the outer layers are laminated to the elastic layer using ultrasonic bonding. In one embodiment, the outer layers may undergo ultrasonic bonding after having first undergone thermal bonding. Alternately, the outer layers may undergo ultrasonic bonding before or in place of underoing thermal bonding. Ultrasonic bonding, in some applications, is better suited to bonding an elastic film to the outer nonwoven layers, especially in embodiments where it is desired not to aperture the film during bonding. Ultrasonic bonding typically employs a nip formed between a sonic horn and a patterned roll. The patterned roll contains a plurality of raised bonding elements to bond the film to the nonwoven web material(s). The size of the bonding elements may be specifically tailored to facilitate the formation of pleats in the final product. For example, the bonding elements are typically selected to have a relatively large length dimension. The length dimension of the bonding elements may be from about 300 to about 5000 micrometers, in some embodiments from about 500 to about 4000 micrometers, and in some embodiments, from about 1000 to about 2000 micrometers. The width dimension of the bonding elements may likewise range from about 20 to about 500 micrometers, in some embodiments from about 40 to about 200 micrometers, and in some embodiments, from about 50 to about 150 micrometers. In addition, the "element aspect ratio" (the ratio of the length of an element to its width) may range from about 2 to about 100, in some embodiments from about 4 to about 50, and in some embodiments, from about 5 to about 20.

Besides the size of the bonding elements, the overall bonding pattern may also be selectively controlled to achieve the desired three-dimensional configuration. In one embodiment, for example, a bonding pattern is selected in which the longitudinal axis (longest dimension along a center line of the element) of one or more of the bonding elements is skewed relative to the machine direction ("MD") of the elastic film. For example, one or more of the bonding elements may be oriented from about 30° to about 150°, in some embodiments from about 45° to about 135°, and in some embodiments, from about 60° to about 120° relative to the machine direction of the film. In one embodiment, one or more of the bonding elements may be skewed relative to the cross-machine direction ("CD") of the elastic film.

The pattern of the bonding elements is generally selected so that the nonwoven composite has a total bond area of less than about 50% (as determined by conventional optical microscopic methods), and in some embodiments, less than about 30%, such as less than 20% and typically greater than 5%. The bond density is also typically greater than about 50 bonds per square inch, and in some embodiments, from about 75 to about 500 pin bonds per square inch.

One suitable bonding pattern is known as the "rib-knit" pattern and is described in U.S. Pat. No. 5,620,779 to Levy, et al., which is incorporated herein in its entirety by reference thereto for all purposes. Rib-knit patterns typically have a bonding element density of from about 150 to about 400 bonding elements per square inch, and in some embodiments, from about 200 to about 300 bonding elements per square inch. An example of a suitable "rib-knit" pattern in shown in FIG. 3, which illustrates bonding elements 89 and bonding elements 91, which are oriented in a different direction. Yet another suitable pattern is the "wire weave" pattern, which has a bonding element density of from about 200 to about 500 bonding elements per square inch, and in some embodiments, from about 250 to about 350 bonding elements per square inch. An example of a suitable "wire-weave" pattern in shown in FIG. 4, which illustrates bonding elements 93 and bonding elements 95, which are oriented in a different direction.

Figure 5:
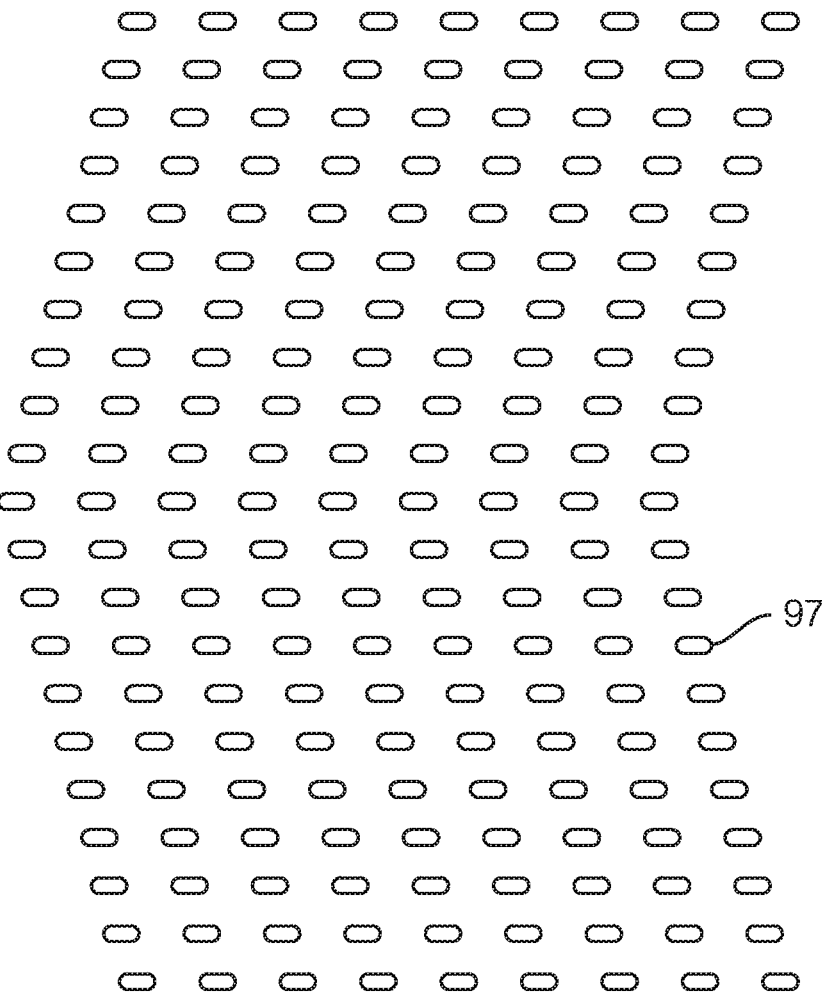
FIG. 5 illustrates another embodiment of a bonding pattern that may be used in accordance with the present disclosure.

In still another embodiment of the present disclosure, another bonding pattern is shown in FIG. 5. The bonding pattern illustrated in FIG. 5 includes bonding elements 97. The bonding elements 97 are generally arranged in rows and columns. The columns, however, form a zigzag shape or wave-like shape over one direction, such as the machine direction. In one embodiment, for instance, the columns form a zigzag shape wherein the columns have an angular displacement of from about 10° to about 20°, such as from about 13° to about 17° from the vertical axis. The bonding elements 97 can have a length of from about 500 micrometers to about 750 micrometers, such as from about 600 micrometers to about 700 micrometers. The bonding elements can have a width of from about 1400 micrometers to about 1700 micrometers, such as from about 1550 micrometers to about 1600 micrometers. Each row can be spaced apart (center of bonding element to adjacent center of bonding element) of from about 2000 micrometers to about 2500 micrometers, such as from about 2300 micrometers to about 2400 micrometers. The columns can be spaced apart (center of bonding element to adjacent center of bonding element) of from about 3500 micrometers to about 4500 micrometers, such as from about 3750 micrometers to about 3850 micrometers. The bonding pattern in FIG. 5 can contain from about 50 bonding elements per square inch to about 100 bonding elements per square inch, such as from about 70 bonding elements per square inch to about 80 bonding elements per square inch.

The selection of an appropriate bonding temperature (e.g., the temperature of a heated roll) will help melt and/soften the low-softening point elastomeric polymer(s) of the film at regions adjacent to the bonding elements. In one embodiment, the bonding conditions are maintained at a temperature and pressure such that the elastic film layer is not apertured during the bonding process. In an alternative embodiment, however, the bonding conditions can be altered so that aperturing occurs. Forming apertures in the film may be desired in certain applications in order to bond the first outer layer directly to the second outer layer for creating a laminate with greater bond strength.

The bonding conditions are maintained. For example, the bonding conditions can be from about 50° C. to about 160° C., in some embodiments from about 60° C. to about 140° C., and in some embodiments, from about 70° C. to about 120° C. Of course, the residence time of the materials may influence the particular bonding parameters employed.

When the elastic layer is bonded to the outer layers, the elastic layer can be stretched from about 20% to about 700% in at least one direction. In one embodiment, the elastic layer is only stretched in a single direction. In different embodiments, the elastic layer is stretched greater than 50%, such as greater than 100%, such as greater than about 200% when bonded to the outer layers. The elastic layer is generally stretched less than 700%, such as less than about 600%, such as less than about 500%, such as less than about 400%, such as less than about 300%, such as less than about 90%, such as less than about 80% when bonded. In one particular embodiment, the elastic layer is stretched from about 40% to about 70%, such as from about 45% to about 65% during the bonding process. Similarly, the resulting laminate can have a elongation when measured at 2000 grams force of from about 20% to about 300%. The elongation, for instance, can be greater than about 30%, such as greater than about 40%, such as greater than about 45%. The elongation is generally less than about 250%, such as less than about 200%, such as less than about 175%, such as less than about 150%, such as less than about 125%.

The film may be "pre-stretched" (prior to lamination) by rolls rotating at different speeds of rotation so that the sheet is stretched to the desired stretch ratio in the machine direction. This uniaxially stretched film may also be oriented in the cross-machine direction to form a "biaxially stretched" film. The orientation temperature profile during the "pre-stretching" operation is generally below the melting point of one or more polymers in the film, but high enough to enable the composition to be drawn or stretched. For example, the film may be stretched at a temperature from about 15° C. to about 50° C., in some embodiments from about 25° C. to about 40° C., and in some embodiments, from about 30° C. to about 40° C. When "pre-stretched" in the manner described above, the degree of stretch during lamination may be increased, maintained, or slightly reduced (retracted) to desired degree of tension.

The method of producing the wiper of the present disclosure can vary depending upon the materials employed and the desired application. In one embodiment, the elastic layer can comprise a film and can be stretch bonded to a first nonwoven outer layer and a second nonwoven outer layer that causes the outer layers to gather when the elastic layer is relaxed.

Any known technique may be used to form a film from the elastomeric material, including blowing, casting, flat die extruding, etc. In one particular embodiment, the film may be formed by a blown process in which a gas (e.g., air) is used to expand a bubble of the extruded polymer blend through an annular die. The bubble is then collapsed and collected in flat film form. For example, in one embodiment, the elastomeric material is supplied to an extrusion apparatus and then blown into nip rolls to form a single-layered elastic film. The rolls may be kept at temperature sufficient to solidify and quench the elastic film as it is formed, such as from about 20 to 60° C. Typically, the resulting elastic film is generally unapertured and continuous.

The film can then be stretched and thinned in the machine direction by passing it through a film-orientation unit or machine direction orienter ("MDO"), such as commercially available from Marshall and Willams, Co. of Providence, R.I. The MDO has a plurality of stretching rolls that progressively stretch and thin the film in the machine direction. The film may be stretched in either single or multiple discrete stretching operations. The film may also be stretched in other directions. For example, the film may be clamped at its lateral edges by chain clips and conveyed into a tenter oven. In the tenter oven, the film may be drawn in the cross-machine direction to the desired stretch ratio by chain clips diverged in their forward travel.

In one embodiment, the film may be stretched and thinned in the cross-machine direction by passing it through a cross-machine direction orienter ("CDO"), which has a plurality of stretching rolls that progressively stretch and thin the film in the machine direction.

The outer layers are generally made from nonwoven materials. The nonwoven web material may be laminated to the elastic layer according to various methods. For example, the nonwoven web material may simply be unwound from a supply roll. Alternatively, a nonwoven web material may be formed in-line, such as by using spunbond extruders. The extruders deposit fibers onto a forming wire, which can be part of a continuous belt arrangement that circulates around a series of rolls. If desired, a vacuum may be utilized to maintain the fibers on the forming wire. The spunbond fibers form a mat that may optionally be compressed via compaction rolls and/or subjected to a point bonded process for producing microscrubbers. A second nonwoven material originating from a supply roll or produced on-line may also be laminated to the elastic film for producing the second outer layer.

The three materials are then brought together while the elastic layer is in a stretched state. The three layers can be directed into a nip defined between pattern rolls for ultrasonically bonding the materials together and producing the laminate. In one embodiment, the three layers may be thermally bonded and then ultrasonically bonded such that from about 2% to about 6% of the bonded area is ultrasonically bonded. In one embodiment, the three layers may be ultrasonically bonded such that from about 0.5% to about 10% of the surface area of the facing is ultrasonically bonded. One or both rolls may contain a plurality of raised bonding elements. Upon lamination, the elastic film is melt fused to the nonwoven web materials and at a plurality of discrete bond sites. That is, the elastomeric polymer(s) of the film are softened and/or melted so that they may physically entrap fibers of the nonwoven web materials.

The resulting composite may then be wound and stored on a take-up roll. Optionally, the composite is kept under tension, such as by using the same linear velocity for the take-up roll as the speed of one or more of the stretching rolls. More preferably, however, the composite is allowed to retract prior to winding on to the take-up roll. This may be achieved by using a slower linear velocity for the roll.

Because the elastic film is tensioned prior to lamination, it will retract toward its original machine direction length and become shorter in the machine direction, thereby buckling or forming gathers in the composite. The resulting elastic composite thus becomes extensible in the machine direction to the extent that the gathers or buckles in the web may be pulled back out flat and allow the elastic film to elongate.

Various additional potential processing and/or finishing steps, such as slitting, treating, printing graphics, etc., may be performed. For instance, the composite may optionally be mechanically stretched in the cross-machine and/or machine directions to enhance extensibility. In one embodiment, the composite may be coursed through two or more rolls that have grooves in the CD and/or MD directions.

After the elastic composite is formed, the composite can be cut into individual sheets or wipers. The dimensions of the wiper can vary in accordance with the particular end use and/or desired function of the wiper. In certain embodiments, the wiper can have a diameter (in its greatest dimension) of between about 5 in and about 50 in, and in certain embodiments between about 12 in and about 34 cm. In other embodiments, the wipe can have a length and/or width between about 2 in and about 40 in or between about 4 in and about 36 in. For example, in certain embodiments, the wiper may have a width and height of about 4" by 4", such as about 4" by about 8", such as about 8" by 8", such as about 12" by 12", such as about 16" by 16", such as about 12" by 18", such as about 18" by 24", such as about 18" by 36", such as about 24" by about 36." The wiper can have any one of various shapes such as rectangular, square, elliptical, round and so forth. In addition, the edges themselves may be cut to have a straight edge or to have more complex or irregular shape such as being curvilinear (e.g. having a scalloped or sinusoidal shaped edge).

In one embodiment, after the composites are cut into wipers, the individual wipers can then be stacked and packaged. In an alternate embodiment, the wipers may be packaged individually. In one embodiment, the wipers are stacked and/or packaged in a dry state which is best for cleaning oily substances.

Figure 6:
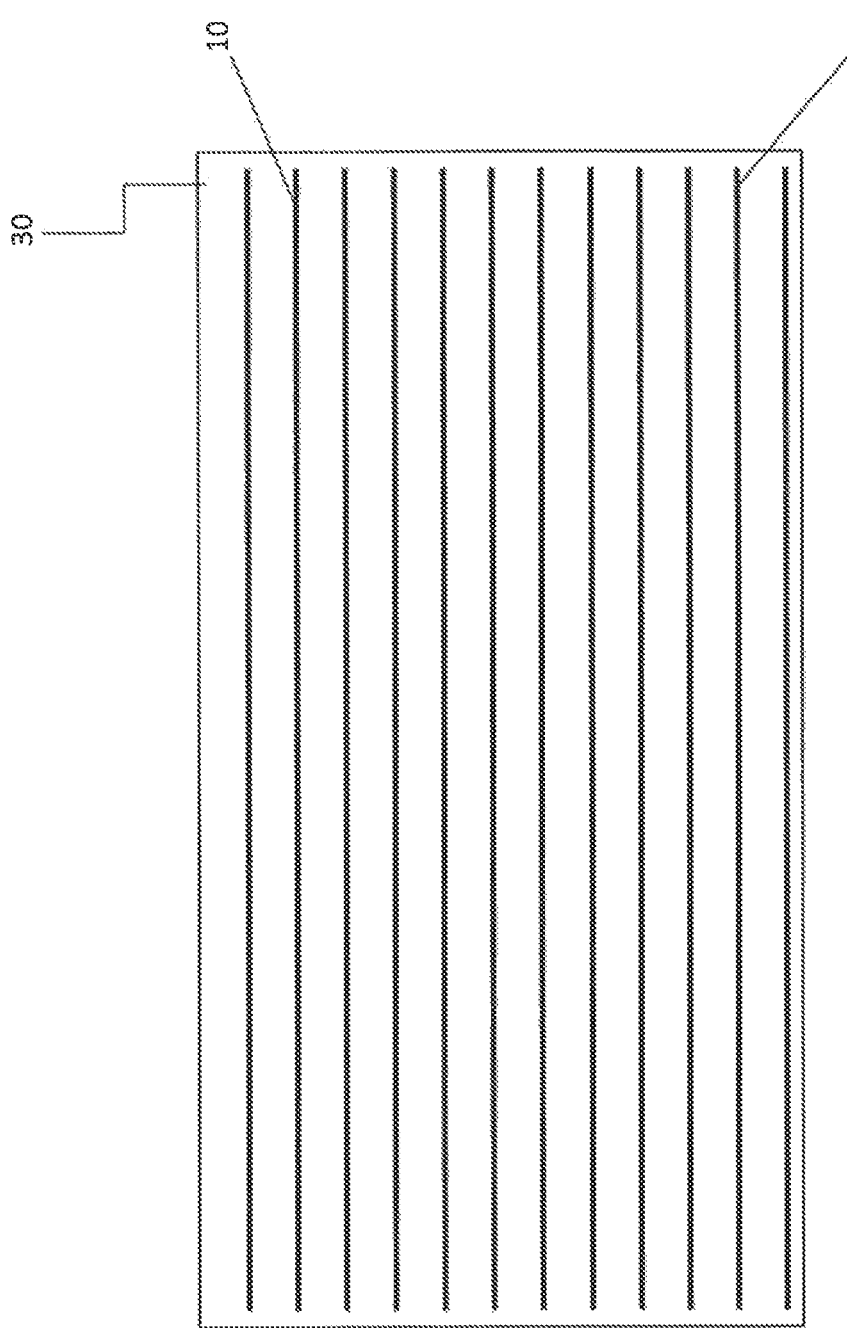
FIG. 6 is a cross-sectional view of a package containing a plurality of stacked wipers in accordance with the present disclosure.

Referring to FIG. 6, for instance, a package 30 is illustrated containing a stack of wipers 10 made according to the present disclosure. The wipers 10 are contained within the package in a dry state. In an alternate embodiment, the package 30 may contain a single wiper. The package 30 may be made from any suitable packaging material. For instance, the package 30 may be made from paperboard, a polymer film, a rigid plastic, or the like. The package 30 may be of any form, such as, for example, plastic pouches or bags, canisters, jars, tubs, buckets and so forth. In one embodiment, the package 30 may be a resealable container.

As used herein, the term "stack" is used broadly to include any collection of sheets wherein there is a plurality of individual sheets having surface-to-surface interfaces; this not only includes a vertically stacked collection of individual sheets, but also includes a horizontally stacked collection of individual sheets as well as a rolled or folded collection of sheets.

The particular stack height and sheet count can vary with the intended format and use. The sheets can be oriented in the stack and the stack incorporated into the container in a manner intended to improve efficiency of use and/or dispensing as is known in the art. In certain embodiments, stacks of wipers are desirably arranged and combined with a dispenser to facilitate one at a time dispensing and including known "pop-up" dispensing formats. In one embodiment, the wipers may be maintained in a dispenser employing tabbed and/or continuous roll-type stacks.

In one embodiment of the present disclosure, a composition may be applied to the wiper or one or more portions thereof during or after formation of the wiper. For example, an oil absorbing composition may be applied to the wiper or one or more portions thereof to improve the oil absorption properties of the wiper. Some suitable compositions which may be applied to the wiper or portions thereof are described in U.S. Provisional Application Ser. No. 62/315,714 and U.S. Provisional Application Ser. No. 62/261,652, incorporated herein by reference.

In one embodiment, the composition may comprise a thermoplastic elastomeric copolymer, a superabsorbent material, and a solvent, the thermoplastic elastomeric copolymer being dissolved in the solvent. The thermoplastic elastomeric copolymer may be oleophilic. In one embodiment, the composition may comprise a thermoplastic elastomeric copolymer selected from the group consisting of: polystyrene-polyisoprene-polystyrene, polystyrene-block-polybutadiene-block-polystyrene, polystyrene-block-poly(ethylene-ran-polybutylene)-block-polystyrene, polystyrene-block-polybutadiene-block-polystyrene, alpha-methylstyrene-vinyltoluene-copolymer, and ethylene-octene-1 copolymer.

In another embodiment, the composition may comprise an elastomeric copolymer and a solvent in which the elastomeric copolymer is dissolved. The composition may be configured to dry after being applied to a surface, leaving an elastomeric copolymer film. The thermoplastic elastomeric copolymer may be oleophilic. In one embodiment, the elastomeric copolymer may be selected from polystyrene-polyisoprene-polystyrene, polystyrene-block-polybutadiene-block-polystyrene, polystyrene-block-poly(ethylene-ran-polybutylene)-block-polystyrene, polystyrene-block-polybutadiene-block-polystyrene, alpha-methylstyrene-vinyltoluene-copolymer, and ethylene-octene-1 copolymer.

The compositions described herein may be applied to the wiper after the elastic composite is formed but prior to other processing, such as cutting, stacking, and/or packaging the wipers. Alternately, the compositions may be applied to one or more of the nonwoven outer layers of the wiper prior to formation of the elastic composite. In one embodiment, the composition may be uniformly applied to the wiper or portion thereof. In another embodiment, the composition may be applied to the wiper or portion thereof in the form of a pattern.

The wipers of the present disclosure are well suited for wiping up oily substances including grease and other contaminants. The wipers can be used in numerous and diverse applications. For example, the wipers are particularly well suited for use in industrial settings for wiping down machinery and/or used in laboratories. The wipers are also well suited for use in mechanic shops, such as auto repair centers. The wipers are also well suited for consumer use and in various other applications.

Wiping products made according to the present disclosure have excellent overall properties in addition to oil absorption properties. The wipers, for instance, have great drape properties and form-fitting properties. The wipers can have an overall thickness of greater than about 0.8 mm, such as greater than about 1 mm, such as greater than about 1.3 mm, such as greater than about 1.5 mm, such as greater than about 1.8 mm. The thickness of the wipers is generally less than about 4 mm, such as less than about 3 mm. The wipers can have an oil absorbency of greater than about 8 grams/4"×4", such as greater than about 9 grams/4"×4", such as greater than about 10 grams/4"×4", such as greater than about 11 grams/4"×4", such as greater than about 12 grams/4"×4". The oil absorbency is generally less than about 50 grams/4"×4". Oil absorbency (g/4"4") is measured by dipping a wiper having dimensions of 4"×4" into 10W30 motor oil for 180 seconds, allowing the wiper to drain for 300 seconds, and then measuring the amount of oil absorbed by the product.

In addition to having excellent oil absorption properties, the wipers can also have excellent wiping efficiency. For instance, the wipers can have a wiping efficiency of greater than 100%, such as greater than 200%, such as greater than 300%, such as even greater than 400%. The wiping efficiency is generally less than about 1000%, such as less than about 900%, such as less than about 800%, such as less than about 700%, such as less than about 600%, such as less than about 500%.

The present invention may be better understood with reference to the following examples.

Test Methods

Tensile Properties

The strip tensile strength values were determined in substantial accordance with ASTM Standard D-5034. Specifically, a sample was cut or otherwise provided with size dimensions that measured 1 inch (25.4 millimeters) (width)×6 inches (152.4 millimeters) (length). A constant-rate-of-extension type of tensile tester was employed. The tensile testing system was a Sintech Tensile Tester, which is available from MTS Corp. of Eden Prairie, Minn. The tensile tester was equipped with TESTWORKS 4.08B software from MTS Corporation to support the testing. An appropriate load cell was selected so that the tested value fell within the range of 10-90% of the full scale load. The sample was held between grips having a front and back face measuring 1 inch (25.4 millimeters)×3 inches (76 millimeters). The grip faces were rubberized, and the longer dimension of the grip was perpendicular to the direction of pull. The grip pressure was pneumatically maintained at a pressure of 60 to 80 pounds per square inch. The tensile test was run at a 20 inches per minute rate with a gauge length of 4 inches and a break sensitivity of 40%. Three samples were tested along the machine-direction ("MD") and three samples were tested by along the cross direction ("CD"). In addition, the ultimate tensile strength ("peak load"), and peak elongation was also recorded.

Elongation (Stretch-to-Stop)

The testing was done on a Sintech constant rate of extension tester 2/S with a Renew MTS mongoose box (controller) using TESTWORKS 4.08b software (MTS Corp, of Eden Prairie, Minn.). The percent elongation of the material at a load of 2000 grams-force was determined as described below. Such measurements are determined using the "strip elongation test", which is substantially in accordance with the specifications of ASTM D5035-95. The test uses two clamps, each having two jaws with each jaw having a facing in contact with the sample. The clamps hold the material in the same plane and move apart at a specified rate of extension. A sample size of 3 inches in the cross-machine direction by 7 inches in the machine direction was selected. The grip size was 3 inches in width, and intermeshing grips were utilized so that material would not slip while tested. The grip separation was 4 inches. The samples were loaded so that the machine direction of the sample was in the vertical direction. A preload of approximately 5 to 10 grams-force was set. The samples were tested at a crosshead speed of 20 in per minute. The sample was displaced until 2000 grams-force of tension was produced, and then the test was stopped. The test reported the % elongation when 2000 grams-force of tension was produced. Results were reported as an average of three specimens and may be performed with the specimen in the cross direction (CD) and/or the machine direction (MD).

IPS STM-00103 Absorbent Capacity, Vertical Test Method

Cut each specimen 101 by 101±3 mm (4 by 4±0.04 inch). Prepare a minimum of 3 specimens. Soak the specimen in the testing fluid for the following times.

| Testing Fluid | Soak Time |
|---|---|
| Water | 3 minutes ± 5 seconds |
| Oil | 3 minutes ± 5 seconds |
| Other fluids | as directed |

At the end of the soaking time, remove the specimen from the testing fluid with tongs and hang it in a diamond-shape so that one corner is lower than the rest of the specimen. Allow the specimen to drain for the following times.

| Testing Fluid | Drain Time |
|---|---|
| Water | 3 minutes ± 5 seconds |
| Oil | 5 minutes ± 5 seconds |
| Other fluids | as directed |

At the end of the specified draining time, remove the specimen by holding the weighing dish under it and releasing it from the clamping device. Weigh the wet specimen to the nearest 0.01 g and record the value as the Wet Weight. Absorbent Capacity (g/specimen area)=Wet Weight (g)— Dry Weight (g)
Specific Capacity (g/g)=Absorbent Capacity (g)/Dry Weight (g)
% Absorption=Specific Capacity (g/g)×100

EXAMPLE

Sample wipes formed from elastic copolymers were tested for wiping efficiency. Characteristics of the sample wipes, WyPall® X90 and X80 wipes (hydroentangled spunbond web with pulp fibers), Scott® Shop Towel, and a rag are described in Tables 2A-B below.

TABLE 2A

Figure 3:
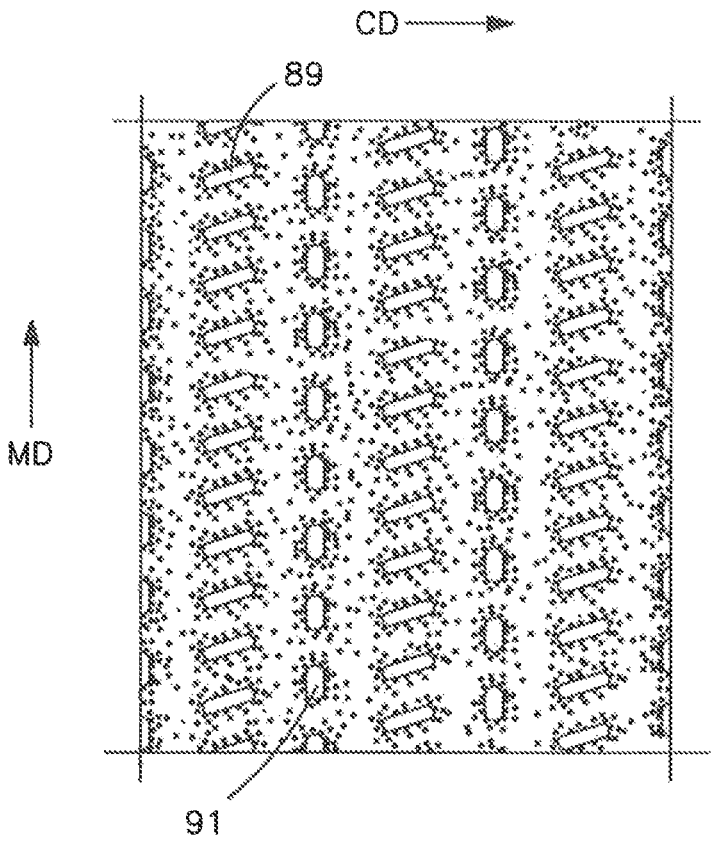
FIG. 3 illustrates one embodiment of a "rib-knit" bonding pattern that may be used in accordance with the present invention.
Figure 4:
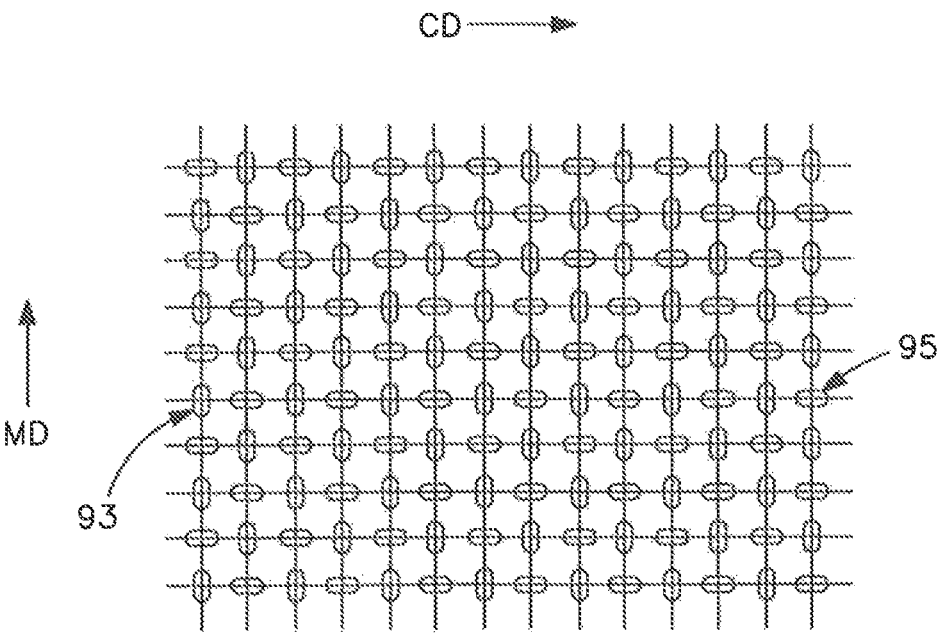
FIG. 4 illustrates one embodiment of a "wire-weave" bonding pattern that may be used in accordance with the present invention.

| | | | | | | | | |
|---|---|---|---|---|---|---|---|---|
| Characteristics of sample wipes. | | | | | | | | |
| Sample Name | Facing Type | Facing Fiber Denier | Facing Starting (flat) Basis Weight (gsm) | Laminate Bond Roll | Film Polymer | Total Laminate Basis Weight (gsm) | SB Basis Weight in Laminate (gsm) | SB BW Ratio (Gathered vs. Flat) |
| 1 | SB | 2.2 | 12 | FIG. 3 | EBC* | 112.9 | 74.9 | 3.1 |
| 2 | SB | 2.2 | 12 | FIG. 5 | EBC | 76.2 | 45.3 | 1.9 |
| 3 | MB | fat | 20 | FIG. 3 | EBC | 152.9 | | |
| 4 | SB | 2.2 | 12 | FIG. 3 | EBC | 118.5 | 79.8 | 3.3 |
| 5 | SB | 2.2 | 12 | FIG. 5 | EBC | 72.1 | 47.7 | 2.0 |
| Shop Towel | | | | | | | | |
| Rag | | | | | | | | |
| X80 Towel | | | | | | | | |
| X90 Towel | | | | | | | 97.1 | |

| Sample Name | Film Basis Weight in Laminate (gsm) | Laminate Thickness (mm) | MD Peak Load (gf) | MD Peak Stretch (%) | MD Peak Energy (g * cm) | MD STS (Elongation @ 2000 gf) (%) |
|---|---|---|---|---|---|---|
| 1 | 38.0 | 2.11 | 9395 | 343 | 70309 | 218 |
| 2 | 28.1 | 1.97 | 12255 | 186 | 61067 | 101 |
| 3 | | 3.82 | 3692 | 234 | 17499 | 193 |
| 4 | 38.7 | 2.30 | 10552 | 358 | 80358 | 222 |
| 5 | 23.9 | 1.86 | 7360 | 187 | 39917 | 101 |
| Shop Towel | | | | | | |
| Rag | | | | | | |
| X80 Towel | | | | | | |
| X90 Towel | | 0.82 | 18009 | 34 | 33662 | 2 |

*Ethylene octane block copolymer (EBC)

TABLE 2B

| | | | | | | | |
|---|---|---|---|---|---|---|---|
| Sample Name | Air Permeability (cfm) | Peel/Bond Strength Average Load (gf) | Pleat Frequency (#/mm) | Pleat Amplitude or SB thickness (microns) | Calculated bulk density of facings in the laminate (g/m^3) | Calculated porosity (%) | STM-00103 Absorbent Capacity, Vertical Test Fluid: 10w30 4 in × 4 in specimen (g) |
| 1 | 56 | 428 | 1.93 | 698 | 107322 | 89% | 13.8 |
| 2 | 73 | 470 | 0.90 | 666 | 67924 | 93% | 10.7 |
| 3 | 54 | 183 | | | | | 14.0 |
| 4 | 158 | 118 | 1.41 | 695 | 114775 | 88% | 13.4 |
| 5 | 58 | 651 | 0.92 | 799 | 59653 | 94% | 10.7 |
| Shop Towel | | | | | | | 6.6 |
| Rag | | | | | | | 7.3 |
| X80 Towel | | | | | | | 4.3 |
| X90 Towel | 105 | 408 | | | | | 6.1 |

Characteristics of sample wipes (cont.)

| Sample Name | Absorbent Capacity, Vertical Test Fluid: 10w30 Specific Capacity (g/g) | STM-00104/1 Vertical Wicking Rate Direction: MD Fluid: 10W-30 Motor Oil Measurement at 60 Sec (cm) | The Reverse Osmosis Test Size: 9" × 9" Test Fluid: 10w30 Wet Out (Seconds) |
|---|---|---|---|
| 1 | 11.26 | 0.9 | 6.1 |
| 2 | 13.26 | | |
| 3 | 8.90 | 0.7 | 45.8 |
| 4 | 10.96 | 0.7 | 10.1 |
| 5 | 13.94 | | |
| Shop Towel Rag | | | |
| X80 Towel | 3.9 | | |
| X90 Towel | 6.04 | | |

Wiping efficiency tests were performed on the sample wipes and WyPall® X90 and X80 wipes by Kimberly-Clark®. Wiping efficiency was measured using a modified test protocol based on ASTM D2486 using a BYK Gardner® Scrub Abrasion Tester with a plate dimension of 88 mm by 63 mm.

Oil wiping efficiency was tested by applying 2.0 g of modified engine oil (96% Valvoline® VR1 Racing SAE 50 Motor Oil, 2% carbon black) to the center of pre-weighed standard diamond plates (17.5"×6"; approximately 316 g). The initial weights of the sample and then the slate and magnets were recorded. The sample was placed onto the slate so that the wiper ran perpendicular to the cross direction; the initial weight of the sample and slate combined was taken. The soiled diamond plate and slate were placed into the BYK Gardner Scrub Tester (Abrasion Tester), which was then set to run 15 passes for each wipe sample (25 passes for samples 40B, 1C, and 13B). After the wiper cleaned the plate, the weight of the block, magnets, and wiper were recorded; the wiper was weighed alone after completing 15 passes. The final weight of the block and magnets were weighed and recorded. This process was repeated for three plates per wipe sample. Grease wiping efficiency was tested by applying 2.0 g of modified gear grease (96% SUPER-TECH® Multi-Duty Complex High Temperature Grease, 4% carbon black) to the center of pre-weighed flat aluminum plates (12"×3"; approximately 164-168 g). The grease was spread evenly onto the plate. The initial weights of the wiper and the block, wiper, and magnets in combination were recorded. The soiled plate was placed into the GARDNER® Abrasion Tester, which was set to run 25 passes for each wipe sample. After the wiper cleaned the plate, the weight of the block, magnets, and wiper were recorded; the wiper was weighed alone after completing 25 passes. The final weight of the block and magnets were weighed and recorded. This process was repeated for three plates per wipe sample.

Oil absorbent capacity was measured for each wipe using the Absorbent Capacity testing protocol from IPS Testing. A container is filled with at least 50 mm of motor oil in order to submerge a 4"×4" piece of a sample wiper. The 4"×4" piece is weighed, and the value is recorded as dry weight of the piece. Each wiper piece was submerged in motor oil for 3 minutes, removed from the testing fluid using prongs, and hung in a diamond-shape such that one corner of the piece is lower than the other corners of the piece. The piece was allowed to dry for 5 minutes. The weight of each wet piece was recorded as the wet weight. Each sample wiper is tested 3 separate times. Absorbent capacity (g/4"×4") was calculated by subtracting the wet weight from the dry weight. Specific capacity (g/g) was calculated by dividing absorbent capacity by the dry weight of the material. Percent absorption was calculated by multiplying the specific capacity by 100%.

Results from the wiping efficiency and absorbency capacity tests are presented in Table 3 below. Sample wipes 2 and 5 had the highest oil and grease wiping efficiency and picked up the greatest amount of grease as measured by weight (g). Sample wipes 1, 3, and 4 had the highest oil absorbent capacity measured by weight (g) of oil absorbed by a 4" by 4" wipe sample. Sample wipes 1, 2, and 3 picked up the greatest amount of oil as measured by weight (g) during the Gardner wiping test.

TABLE 3

| Sample Name | STM-00103 Absorbent Capacity, Vertical Test Fluid: 10w30 4 in × 4 in specimen (g) | Oil Wiping Efficiency % | Normalized Oil Wiping Efficiency (X80) | Normalized Oil Absorbency Capacity (X80) | Grease Wiping Efficiency % | Normalized Grease Wiping Efficiency (X80) | Oil Picked Up by Wiper (g) | Grease Picked Up by Wiper (g) | # of passes for wiping test |
|---|---|---|---|---|---|---|---|---|---|
| Oil and grease wiping efficiency and oil absorption for sample wipes Modified Gardner Wiping Test | | | | | | | | | |
| 1 | 13.8 | 289% | 1.53 | 3.38 | 164% | 1.04 | 1.81 | 1.03 | 25 oil, 25 grease |
| 2 | 10.7 | 406% | 2.15 | 2.63 | 339% | 2.49 | 1.72 | 1.43 | 15 oil, 25 grease |
| 3 | 14.0 | 203% | 1.07 | 3.43 | 67% | 0.49 | 1.72 | 0.57 | 15 oil, 25 grease |
| 4 | 13.4 | 254% | 1.35 | 3.28 | 171% | 1.25 | 1.67 | 1.12 | 15 oil, 25 grease |
| 5 | 10.7 | 414% | 2.19 | 2.62 | 356% | 2.62 | 1.67 | 1.44 | 15 oil, 25 grease |
| Shop Towel | 6.6 | 123% | 0.65 | 1.62 | 86% | 0.63 | 1.37 | 0.96 | 15 oil, 25 grease |
| Rag | 7.3 | 140% | 0.74 | 1.78 | 120% | 0.88 | 1.31 | 1.12 | 15 oil, 25 grease |
| X80 Towel | 4.3 | 189% | 1.00 | 1.00 | 136% | 1.00 | 1.08 | 0.78 | 15 oil, 25 grease |
| X90 Towel | 6.1 | 210% | 1.12 | 1.47 | 166% | 1.22 | 1.05 | 0.83 | 15 oil, 25 grease |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A dry wiper for picking up oily substances comprising:

a first nonwoven outer layer containing synthetic fibers, wherein the first nonwoven outer layer comprises a spunbond web;

an oleophilic elastic layer comprising a film, the oleophilic elastic layer comprising a thermoplastic elastomer, the thermoplastic elastomer including an amorphous portion and a crystalline portion, the crystalline portion comprising from about 3% to about 25% of the thermoplastic elastomer, the thermoplastic elastomer comprising a latent heat of fusion of from about 15 to about 75 Joules per gram, wherein the thermoplastic elastomer has an oil absorption of about 0.8 grams of oil per gram of copolymer (g/g) or greater at 24 hours; and a second nonwoven outer layer containing synthetic fibers, wherein the second nonwoven outer layer comprises a meltblown or coform web;

wherein one or more of the first and second nonwoven outer layers includes at least one microscrubber, wherein the at least one microscrubber comprises an area where the synthetic fibers of the first nonwoven outer layer and/or the second nonwoven outer layer have been thermally bonded together prior to laminating the one or more of the first and second nonwoven outer layers to the elastic layer, wherein the at least one microscrubber is formed by the synthetic fibers being thermally bonded together;

wherein the first nonwoven outer layer and the second nonwoven outer layer have been stretch bonded to the elastic layer to form a laminate such that the laminate has a stretch-to-stop of at least 30% in one direction at a load of 2000 grams force and such that the first nonwoven outer layer forms a gathered layer that has a basis weight ratio of greater than about 1.3 when compared to the first nonwoven outer layer laid flat, further wherein the first nonwoven outer layer defines at least one pleated area defined by a plurality of parallel folds, at least certain of the pleats having a pleat amplitude of greater than about 300 microns;

wherein the first nonwoven outer layer and the second nonwoven outer layer have been stretch bonded to the elastic layer according to a bond pattern that occupies from about 3% to about 25% of a surface area of the elastic layer; and wherein the resulting dry wiper has an oil absorbency of at least 8 grams of oil per gram of wipe.

2. A dry wiper as defined in claim 1, wherein the laminate has a stretch-to-stop of from about 40% to about 150% in the one direction.

3. A dry wiper as defined in claim 1, wherein the elastic layer comprises a thermoplastic elastomer, the elastic layer being capable of absorbing at greater than 1.3 g/g of oil after 24 hours.

4. A dry wiper as defined in claim 1, wherein the first nonwoven outer layer comprises spunbond web that has a basis weight ratio of greater than about 7 and less than about 10 when compared to the first nonwoven outer layer laid flat.

5. A dry wiper as defined in claim 1, wherein the pleated area has a pleat frequency of from about 0.5 pleats per millimeter to about 8 pleats per millimeter.

6. A dry wiper as defined in claim 1, wherein the second nonwoven outer layer comprises a meltblown web or a coform web.

7. A dry wiper as defined in claim 1, wherein the second nonwoven outer layer comprises a spunbond web.

8. A dry wiper as defined in claim 1, wherein the elastic layer comprises a continuous, non-apertured film.

9. A dry wiper as defined in claim 1, wherein the elastic layer comprises an apertured film.

10. A dry wiper as defined in claim 1, wherein the elastic layer has a basis weight of from about 1.5 gsm to about 40 gsm.

11. A dry wiper as defined in claim 1, wherein the wiper has a wiping efficiency of greater than 200% when tested against the first nonwoven outer layer.

12. A dry wiper as defined in claim 1, wherein the synthetic fibers contained in the first nonwoven outer layer have a denier of greater than about 0.1, the synthetic fibers having a denier of less than about 8.

13. A dry wiper as defined in claim 1, wherein the first nonwoven outer layer and the second nonwoven outer layer are thermally bonded to the elastic layer.

14. A dry wiper as defined in claim 1, wherein the first nonwoven outer layer and the second nonwoven outer layer are ultrasonically bonded to the elastic layer.

15. A dry wiper as defined in claim 1, wherein the wiper comprises at least one internal functional surface, the at least one internal functional surface forming a reservoir for storage of oil and contaminants.

16. A dry wiper as defined in claim 1, wherein an oil absorbing composition is applied to the wiper or one or more portions thereof.

17. A dry wiper product comprising a plurality of dry wipers as defined in claim 1, the dry wipers being contained within an outer package.

18. A dry wiper for picking up oily substances comprising:

a first nonwoven outer layer containing synthetic fibers, wherein the first nonwoven outer layer comprises a spunbond web;

an oleophilic elastic layer, the oleophilic elastic layer comprising a thermoplastic elastomer, the thermoplastic elastomer including an amorphous portion and a crystalline portion, the crystalline portion comprising from about 3% to about 25% of the thermoplastic elastomer, the thermoplastic elastomer comprising a latent heat of fusion of from about 15 to about 75 Joules per gram, the thermoplastic elastomer also including hard block sections that are partially crystalline and amorphous soft block sections, the amorphous soft block sections being oil absorbent while the hard block sections prevent the thermoplastic elastomer from dissolving in oil and wherein the thermoplastic elastomer contained in the elastic layer comprises an ethylene a-olefin copolymer, a propylene a-olefin copolymer, or a combination thereof, wherein the thermoplastic elastomer has an oil absorption of about 0.8 grams of oil per gram of copolymer (g/g) or greater at 24 hours; and a second nonwoven outer layer containing synthetic fibers, wherein the second nonwoven outer layer comprises a meltblown or coform web;

wherein one or more of the first and second nonwoven outer layers includes at least one microscrubber, wherein the at least one microscrubber comprises an area where the synthetic fibers of the first nonwoven outer layer and/or the second nonwoven outer layer have been thermally bonded together prior to laminating the one or more of the outer layers to the elastic layer, wherein the at least one microscrubber is formed by the synthetic fibers being thermally bonded together;

wherein the first nonwoven outer layer and the second nonwoven outer layer have been stretch bonded to the elastic layer to form a laminate such that the laminate has a stretch-to-stop of at least 30% in one direction at a load of 2000 grams force and such that the first nonwoven outer layer forms a gathered layer that has a basis weight ratio of greater than about 1.3 when compared to the first nonwoven outer layer laid flat, further wherein the first nonwoven outer layer defines at least one pleated area defined by a plurality of parallel folds, at least certain of the pleats having a pleat amplitude of greater than about 300 microns.

19. A dry wiper as defined in claim 18, wherein the elastic layer comprises a continuous film.

20. A dry wiper as defined in claim 18, wherein the thermoplastic elastomer contained in the elastic layer comprises an ethylene octene block copolymer.

21. A dry wiper as defined in claim 18, wherein the thermoplastic elastomer contained in the elastic layer comprises a polystyrene-polyisoprene-polystyrene copolymer, the copolymer containing polystyrene in an amount from about 5% to about 20% by weight.

22. A dry wiper as defined in claim 18, wherein the elastic layer comprises a nonwoven web.

23. A dry wiper as defined in claim 14, wherein the ultrasonic bonding comprises a patterned roll comprising a plurality of raised bonding elements, wherein the bonding elements comprise an element aspect ratio ranging from about 2 to about 100.

24. A dry wiper as defined in claim 14, wherein the ultrasonic bonding comprises a patterned roll comprising a plurality of raised bonding elements, wherein one or more of the bonding elements are oriented from about 30° to about 150° relative to the machine direction of the film.

25. A dry wiper as defined in claim 14, wherein the ultrasonic bonding comprises a patterned roll comprising a plurality of raised bonding elements, wherein the bonding elements comprise rows and columns.

26. A dry wiper as defined in claim 25, wherein the columns form a zig-zag or wave-like shape in the machine direction.

* * * * *